(12) United States Patent
Chan et al.

(10) Patent No.: US 11,507,048 B2
(45) Date of Patent: Nov. 22, 2022

(54) DETECTOR AND REFLECTOR FOR AUTOMATION CELL SAFETY AND IDENTIFICATION

(71) Applicant: The Boeing Company, Chicago, IL (US)

(72) Inventors: Kwok Tung Chan, Seattle, WA (US); Tanni Sisco, Mukilteo, WA (US); Mark Albrecht, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 114 days.

(21) Appl. No.: 16/716,154

(22) Filed: Dec. 16, 2019

(65) Prior Publication Data

US 2021/0181708 A1 Jun. 17, 2021

(51) Int. Cl.
*G05B 19/4061* (2006.01)

(52) U.S. Cl.
CPC ...... *G05B 19/4061* (2013.01); *G05B 2219/33199* (2013.01); *G05B 2219/50193* (2013.01)

(58) Field of Classification Search
CPC ..... H04W 4/029; H04W 4/021; H04W 4/023; H04W 12/08; H04W 4/025; H04W 4/026; H04W 64/00; H04W 72/0453; H04W 4/02; H04W 4/33; H04W 52/0229; H04W 64/003; G07C 9/28; G07C 2209/04; G08B 13/2417; G08B 13/2462; G08B 21/02; G08B 13/248; G08B 21/0446; G08B 13/2448; G08B 13/2471; G08B 13/2474; G01S 5/14; G01S 13/34; G01S 7/352;

(Continued)

(56) References Cited

U.S. PATENT DOCUMENTS 6,320,509 B1 * 11/2001 Brady ................. B65D 25/205
340/572.7
9,489,813 B1 * 11/2016 Beigel ................ G08B 13/2417
(Continued)

FOREIGN PATENT DOCUMENTS

EP           2863176 A2 *  4/2015  ............. G01C 15/00

OTHER PUBLICATIONS

U.S. Appl. No. 16/269,050, filed Feb. 6, 2019; 95 pages.

*Primary Examiner* — Darrin D Dunn
(74) *Attorney, Agent, or Firm* — Haynes and Boone, LLP

(57) ABSTRACT

Systems, methods, and apparatus for a detector and reflector for automation cell safety and identification are disclosed. In one or more embodiments, a method for machinery safety comprises transmitting, by an active transponder, at least one interrogation signal. The method further comprises receiving, by at least one passive transponder located on a user or on an item, the interrogation signal(s). Also, the method comprises generating, by a non-linear device of the passive transponder(s) in response to the interrogation signal(s), at least one response signal. In addition, the method comprises receiving, by the active transponder, the response signal(s). Additionally, the method comprises determining, by at least one processor, a location of the passive transponder(s) based on the response signal(s). Further, the method comprises determining, by the processor(s), whether the passive transponder(s) is located within a threshold distance away from machinery by using the location of the passive transponder(s).

20 Claims, 19 Drawing Sheets

(58) Field of Classification Search
CPC ........ G01S 13/42; G01S 13/74; G01S 13/767;
G01S 13/84; G01S 13/785; G01S 13/06;
G05B 19/048; G05B 19/406; G05B
19/4061; G05B 2219/2642; G05B
2219/33199; G05B 2219/39091; G05B
2219/49141; G05B 2219/50193
See application file for complete search history.

(56) References Cited

U.S. PATENT DOCUMENTS

| | | | | |
|---|---|---|---|---|
| 2007/0205861 | A1* | 9/2007 | Nair | F16P 3/144 340/5.61 |
| 2008/0079540 | A1* | 4/2008 | Aull | H04B 5/02 340/10.1 |
| 2009/0027225 | A1* | 1/2009 | Farley | G08B 7/06 340/6.11 |
| 2009/0212920 | A1* | 8/2009 | Yang | E05B 73/0017 340/10.3 |
| 2009/0272814 | A1* | 11/2009 | Granhed | G06K 19/067 235/492 |
| 2011/0001827 | A1* | 1/2011 | Ortiz | H04L 63/0492 348/156 |
| 2011/0248834 | A1* | 10/2011 | Warner | H04Q 9/00 340/10.34 |
| 2013/0194100 | A1* | 8/2013 | Granhed | A63B 29/021 340/584 |
| 2015/0158428 | A1* | 6/2015 | Beggs | G08B 21/02 340/436 |
| 2016/0295436 | A1* | 10/2016 | Oba | H04W 4/80 |
| 2017/0053143 | A1* | 2/2017 | Cristache | G01S 5/0278 |
| 2017/0270761 | A1* | 9/2017 | Jones | H04W 4/80 |
| 2018/0246201 | A1* | 8/2018 | Wisherd | G01S 13/878 |
| 2020/0112332 | A1* | 4/2020 | Croft | H04B 1/59 |
| 2020/0294377 | A1* | 9/2020 | White | G08B 13/248 |
| 2020/0341137 | A1* | 10/2020 | Mindell | G01S 5/0247 |
| 2021/0020012 | A1* | 1/2021 | Shakedd | G06K 7/10297 |

* cited by examiner

DETECTOR AND REFLECTOR FOR AUTOMATION CELL SAFETY AND IDENTIFICATION

FIELD

The present disclosure relates to detectors and reflectors. In particular, the present disclosure relates to a detector and reflector for automation cell safety and identification.

BACKGROUND

Currently, many factories employ various different costly efforts to ensure that workers do not walk, or enter into, dangerous areas (e.g., near robotic equipment, near large gantry systems, etc.) in an attempt to keep the workers safe. A variety of different solutions have been employed in an attempt to keep workers safe from these hazards. One such solution employs optical sensors that, when triggered by motion within a dangerous area, will cause the momentum of operation of machinery in the dangerous area to slow down or to completely stop. However, these optical sensors (e.g., direct line-of-sight sensors, such as infrared (IR) sensors) have been proven to be sensitive to detecting unwanted random objects in ambient light, which unfortunately triggers false alarms that cause many unnecessary interruptions of the operation of machinery within the factory. Another solution employed is a signal-based wearable device that is worn by the workers. However, these wearable devices require a power source, which requires an additional fail safe redundancy. Image recognition and proximity sensing using three-dimensional (3D) cameras and artificial intelligence (AI) is another solution that is often employed. However, this solution is very expensive and complex, and may also require an additional fail safe redundancy.

In light of the foregoing, there is a need for an improved detector and reflector design.

SUMMARY

The present disclosure relates to a method, system, and apparatus for a detector and reflector for automation cell safety and identification. In one or more embodiments, a method for machinery safety comprises transmitting, by an active transponder, at least one interrogation signal. The method further comprises receiving, by at least one passive transponder located on a user or on an item, at least one interrogation signal. Also, the method comprises generating, by a non-linear device of at least one passive transponder in response to at least one interrogation signal, at least one response signal. In addition, the method comprises receiving, by the active transponder, at least one response signal. Also, the method comprises determining, by at least one processor, a location of at least one passive transponder based on at least one response signal. Further, the method comprises determining, by at least one processor, whether at least one passive transponder is located within a threshold distance away from machinery by using the location of at least one passive transponder.

In one or more embodiments, the method further comprises, when at least one processor determines that at least one passive transponder is located within the threshold distance away from the machinery, generating, by at least one processor, a warning signal indicating that at least one passive transponder is located near the machinery. In some embodiments, the method further comprises displaying, by a display, the warning signal indicating that at least one passive transponder is located near the machinery.

In at least one embodiment, the method further comprises determining, by at least one processor, whether the machinery is operating. In one or more embodiments, the method further comprises, when at least one processor determines that at least one passive transponder is located within the threshold distance away from the machinery and that the machinery is operating, generating, by at least one processor, a safety command signal to command the machinery to slow down the operating speed or to stop operating completely. In some embodiments, the method further comprises, when at least one processor determines that at least one passive transponder is located within the threshold distance away from the machinery and that the machinery is not operating, generating, by at least one processor, a warning signal indicating that at least one passive transponder is located near the machinery that is not operating.

In one or more embodiments, the non-linear device comprises a Schottky diode or a non-linear diode. In at least one embodiment, each of at least one response signal comprises a frequency that is a harmonic frequency of a frequency of at least one interrogation signal. In some embodiments, each of at least one response signal comprises a frequency that is a multiple of a frequency of at least one interrogation signal. In some embodiments, each of at least one passive transponder is configured to generate signals comprising a respective frequency. In one or more embodiments, at least one interrogation signal and at least one response signal are radio frequency (RF) signals.

In at least one embodiment, the determining, by at least one processor, of the location of at least one passive transponder based on at least one response signal is based on a time of arrival (TOA) of at least one response signal and/or an amplitude of at least one response signal.

In one or more embodiments, a method for identification comprises transmitting, by an active transponder, at least one interrogation signal. The method further comprises receiving, by at least one passive transponder located on a user or on an item, at least one interrogation signal. Also, the method comprises generating, by a non-linear device of at least one passive transponder in response to at least one interrogation signal, at least one response signal. In addition, the method comprises receiving, by the active transponder, at least one response signal. Additionally, the method comprises determining, by at least one processor, an identification of the user or the item associated with at least one passive transponder based on a frequency of at least one response signal.

In at least one embodiment, each of at least one passive transponder is configured to generate signals comprising a different harmonic frequency from one another.

In one or more embodiments, the method further comprises determining, by at least one processor, whether the user is authorized for access by using the identification of the user. In at least one embodiment, the method further comprises, when at least one processor determines that the user is authorized for access, generating, by at least one processor, an access command signal to allow access to the user. In some embodiments, the access command signal allows the user to have access to a secure area, a secure computing device, and/or a secure file.

In at least one embodiment, the method further comprises determining, by at least one processor, a number of users or items present by using the identification of the user or item associated with at least one passive transponder. In one or more embodiments, the method further comprises determining, by at least one processor, whether the number of users or items present exceeds a threshold number of users or items. In some embodiments, when at least one processor determines that the number of users or items present exceeds the threshold number of users or items, generating, by at least one processor, a warning signal indicating that the number of users or items present exceeds the threshold number of users or items.

In one or more embodiments, a method for motion capture comprises transmitting, by an active transponder, at least one interrogation signal. The method further comprises receiving, by a plurality of passive transponders located at various different locations on a user or on an item, at least one interrogation signal. Also, the method comprises generating, by a non-linear device of each of the plurality of passive transponders in response to at least one interrogation signal, at least one response signal. In addition, the method comprises receiving, by the active transponder, at least one response signal. Additionally, the method comprises determining, by at least one processor, a location of each of the plurality of passive transponders based on at least one response signal. Further, the method comprises determining, by at least one processor, a capture of motion of the user or the item based on the location of each of the plurality of passive transponders.

In at least one embodiment, the determining, by at least one processor, of the location of each of the plurality of passive transponders based on at least one response signal is based on a time of arrival (TOA) of at least one response signal and/or an amplitude of at least one response signal.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Figure 1:
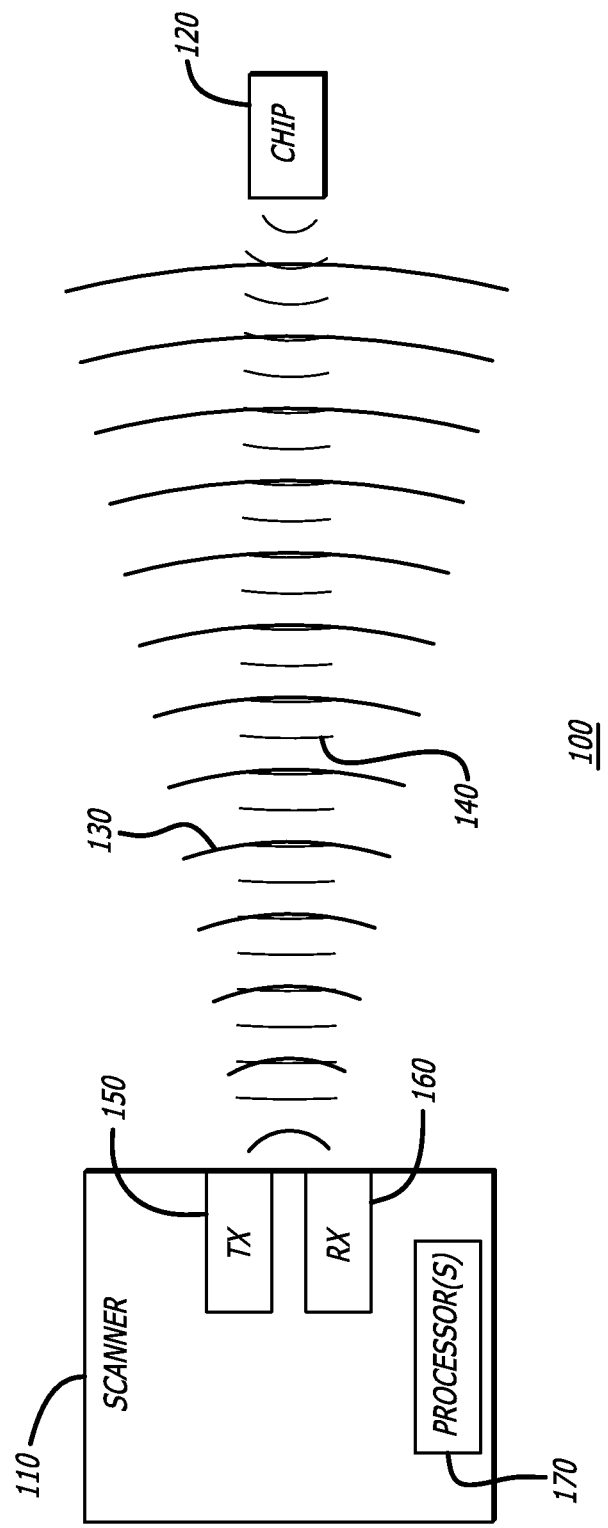
FIG. 1 is a diagram showing the disclosed system for a detector and reflector, in accordance with at least one embodiment of the present disclosure.

The methods and apparatus disclosed herein provide an operative system for a detector and reflector for automation cell safety and identification. In one or more embodiments, the system of the present disclosure employs a non-linear reflector device that is worn (e.g., integrated within a badge, jacket, watch, phone, etc.) by a user (e.g., a factory worker), or is applied to (or integrated within) an item (e.g., an object). The device is a passive non-powered solution that reacts to a microwave signature (e.g., a radio frequency (RF) signal with a specific frequency) and, in response, generates a harmonic (e.g., a RF signal with a harmonic frequency) that is detected. In particular, the device is tuned to receive to signals (e.g., interrogation signals) comprising a specific frequency, and is configured to generate response signals comprising a harmonic frequency.

The disclosed system employs directional RF detectors and reflectors to track the movement and/or location of targets (e.g., humans and/or objects). In addition, the disclosed system uses proximity sensing between the targets and automation platforms to trigger automation safety logistics for avoiding collisions (e.g., collisions of the targets with machinery). In one or more embodiments, the infrastructure used to broadcast as a microwave source and receive response signals can be set up to track targets at close distances.

In one or more embodiments, the detector (e.g., a RF scanner) may be mounted on an automation platform (and/or within an automation cell) for detecting approaching targets. The automation platform may comprise a swiveling (e.g., rotational) axis for providing scanning and tracking capability. In some embodiments, the detector may be mounted within or outside of a production cell (e.g., an automation cell) for tracking targets as a standalone or as part of an integrated automation safety system. In one or more embodiments, the reflector may be mounted on a user or an object.

In at least one embodiment, the disclosed system can be used to track tools during production to mitigate a foreign object debris (FOD) issue during delivery of the product. In addition, the disclosed system can be used to track and locate factory workers (e.g., mechanics) working in confined spaces when they are carrying passive reflector tags.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to reflectors and detectors, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

FIG. 1 is a diagram showing the disclosed system 100 for a detector (e.g., a scanner) 110 and reflector (e.g., a chip) 120, in accordance with at least one embodiment of the present disclosure. In this figure, the detector 110 is an active transponder that is shown to comprise a transmitter (TX) 150, which may comprise a transmit antenna; a receiver (RX) 160, which may comprise a receive antenna; and at least one processor 170 (e.g., also refer to processor(s) 1907 of FIG. 19). The reflector 120 is a passive transponder that comprises a non-linear device, such as a Schottky diode or a non-linear diode. In one or more embodiments, the reflector may be implemented in the form of an integrated circuit (IC) chip, as is shown in FIG. 1. The reflector 120 may be located on user or on an item (e.g., an object). It should be noted that although, as is shown in FIG. 1, the detector 110 comprises the processor(s) 170, in other embodiments, the processor(s) 170 may be located at a location remote from the detector 110.

During operation of the disclosed system, the detector 110 radiates and transmits, via the transmit antenna of the transmitter 150, at least one interrogation signal 130. The interrogation signal(s) 130 is a RF signal that comprises a specific frequency (e.g., frequency band). The reflector 120 is tuned to respond (e.g., resonate) at the specific frequency of the interrogation signal(s) 130. When the interrogation signal(s) 130 of the specific frequency ($f_0$) hits the reflector 120 (i.e. the reflector 120 receives the interrogation signal(s) 130), the non-linear device of the reflector 120 resonates at the interrogation signal(s) 130 frequency ($f_0$) and generates at least one response signal 140. The response signal(s) 140 is an RF signal comprising a harmonic frequency ($nf_0$, where n is an integer), which is a multiple of the specific frequency ($f_0$) of the interrogation signal(s) 130. As such, the reflector 120 operates as a harmonic transponder. For example, the reflector 120 may be designed to operate as a frequency doubler generating a response signal(s) 140 comprising a harmonic frequency ($2f_0$), which is double the interrogation signal(s) 130 frequency ($f_0$).

One of the benefits of employing a reflector 120 that operates as a harmonic transponder (e.g., harmonic radar) is the possibility to obtain improved performance in the presence of strong environmental clutter. If the reflector 120 was designed to simply reflect the interrogation signal(s) 130 to generate a reflected signal comprising the frequency of the interrogation signal(s) 130 in an environment with strong clutter, the reflected signal could be obscured by reflections from surrounding objects or by interference from other radio systems operating at the same frequencies. However, since the reflector 120 generates its response signal(s) 140 to comprise a harmonic frequency of the interrogation signal(s) 130 frequency, it is easier to conclude that the response signal(s) 140 is indeed generated by the reflector 120 rather than by the surroundings. This is due to the fact that most natural objects in the environment do not display nonlinear properties at typical power levels used in radar and, therefore, are not able to reflect back at frequencies other than the incoming frequency.

After the reflector 120 generates the response signal(s) 140 comprising a harmonic frequency, the detector 110 receives, via the receive antenna of the receiver 160, the response signal(s) 140. At least one processor 170 determines the location of the reflector 120 by using the response signal(s) 140. In one or more embodiments, the processor(s) 170 determines the location of the reflector 120 by using the time of arrival (TOA) of the response signal(s) 140 (e.g., the difference in time from when the interrogation signal(s) 130 was transmitted from the detector 110 and when the response signal(s) 140 was received by the detector 110) and/or by using the amplitude of the response signal(s) 140 as received by detector 110.

In one or more embodiments, the disclosed system may employ a plurality of reflectors 120. In some of these embodiments, each of the reflectors 120 is tuned to resonate at the same interrogation signal(s) 130 frequency ($f_0$), and each of the reflectors 120 is designed to generate a response signal(s) 140 comprising the same harmonic frequency (e.g., $2f_0$). In other of these embodiments, each of the reflectors 120 is tuned to resonate at the same interrogation signal(s) frequency, but each of the reflectors 120 is designed to generate a response signal(s) 140 comprising a different harmonic frequency than each other. For example, in response to receiving an interrogation signal(s) 130 comprising a specific frequency ($f_0$), a first reflector 120 is designed to generate a response signal(s) 140 comprising a harmonic frequency ($2f_0$) that is double the interrogation signal(s) 130 frequency ($f_0$), and a second reflector 120 is designed to generate a response signal(s) 140 comprising a harmonic frequency ($3f_0$) that is triple the interrogation signal(s) 130 frequency ($f_0$).

For embodiments that employ a plurality of reflectors 120, where each of the reflectors 120 is tuned to resonate at the same interrogation signal(s) frequency, but each of the reflectors 120 is designed to generate a response signal(s) 140 comprising a different harmonic frequency than each other; during operation, the processor(s) 170 may determine the identification of the user (or item) associated with each of the reflectors(s) 120 by using the frequency of the received response signal(s) 140. For example, if the processor(s) receives a response signal(s) 140 comprising a harmonic frequency ($2f_0$) that is double the interrogation signal(s) 130 frequency ($f_0$), the processor(s) 170 can access a lookup table (e.g., stored in a database, such as database 1932 of FIG. 19) that indicates that the specific reflector 120 designed to generate a response signal(s) 140 comprising a harmonic frequency ($2f_0$) that is double the interrogation signal(s) 130 frequency ($f_0$) is associated with a particular user and, as such, the processor(s) 170 is able to determine the identification of the particular user associated with the specific reflector 120 that generated that particular response signal(s) 140.

Figure 2:
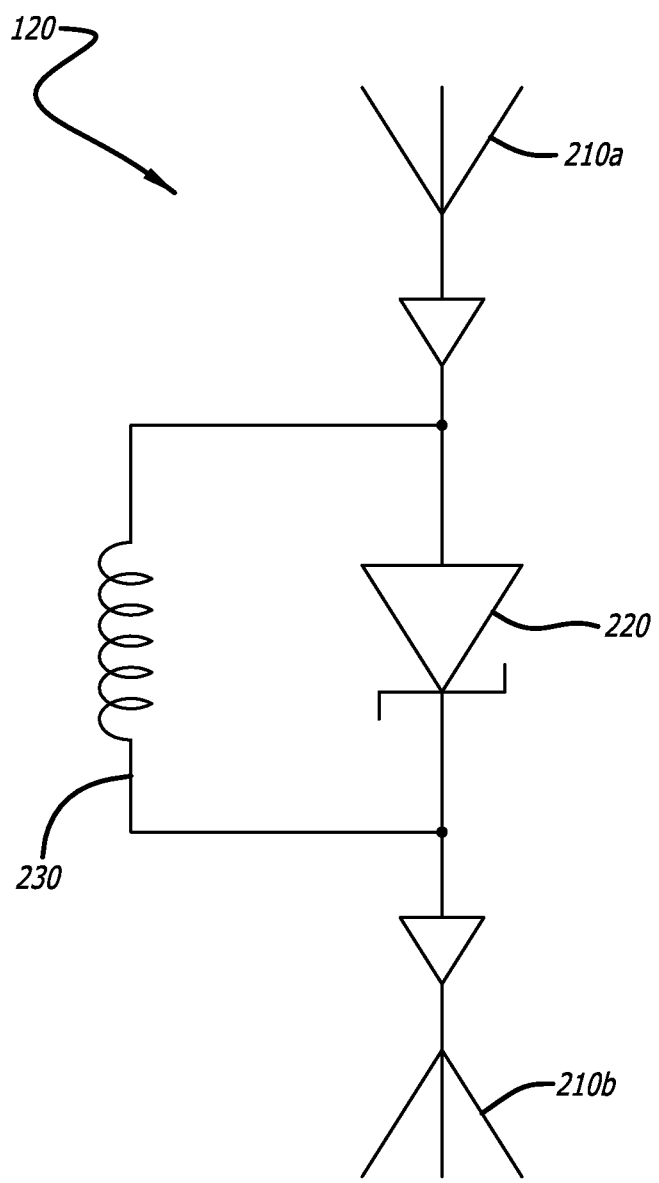
FIG. 2 is a diagram showing the components of the reflector, in accordance with at least one embodiment of the present disclosure.

FIG. 2 is a diagram showing the components of the reflector 120 (e.g., the reflector 120 of FIG. 1), in accordance with at least one embodiment of the present disclosure. In this figure, the reflector 120 comprises a non-linear device 220 connected to a receive antenna 210a and to a transmit antenna 210b. The receive antenna 210a is tuned to the frequency ($f_0$) of the interrogation signal(s) 130 (refer to FIG. 1). The non-linear device 220 is designed to generate, in response to receiving a signal with the interrogation signal(s) 130 frequency ($f_0$), a response signal(s) 140 (refer to FIG. 1) comprising a specific harmonic frequency (e.g., $2f_0$), which is a multiple of the interrogation signal(s) 130 frequency. Various different non-linear devices may be employed for the non-linear device 220 including, but not limited, to a Schottky diode or a non-linear diode. The transmit antenna 210b is tuned to the specific harmonic frequency (e.g., $2f_0$) of the response signal(s) generated by the non-linear device 220. The transmit antenna 210b emits the response signal(s) 140 as a result of the excitation. Also shown is an electrical connection 230 connected between the receive antenna 210a and the transmit antenna 210b. In one or more embodiments, the electrical connection 230 may be implemented as an inductor, as is shown in FIG. 2. The electrical connection 230 can maintain an equal voltage potential for each antenna 210a, 210b.

During operation of the disclosed system, the receive antenna 210a of the reflector 120 receives the interrogation signal(s) 230 transmitted from the detector 110 (refer to FIG. 1). The non-linear device 220 of the reflector 120, in response to receiving the interrogation signal(s) 130, resonates at the interrogation signal(s) 130 frequency ($f_0$) and generates a response signal(s) 140 comprising a specific harmonic frequency (e.g., $2f_0$), which is a multiple of the specific frequency ($f_0$) of the interrogation signal(s) 130. The transmit antenna 210b then transmits the response signal(s) 140, which is received by the detector 110.

It should be noted that FIG. 2 illustrates only one possible configuration of components for the reflector 120 of the disclosed system. In one or more embodiments, various different configurations and components may be employed for the reflector 120 of the disclosed system.

Figure 3:
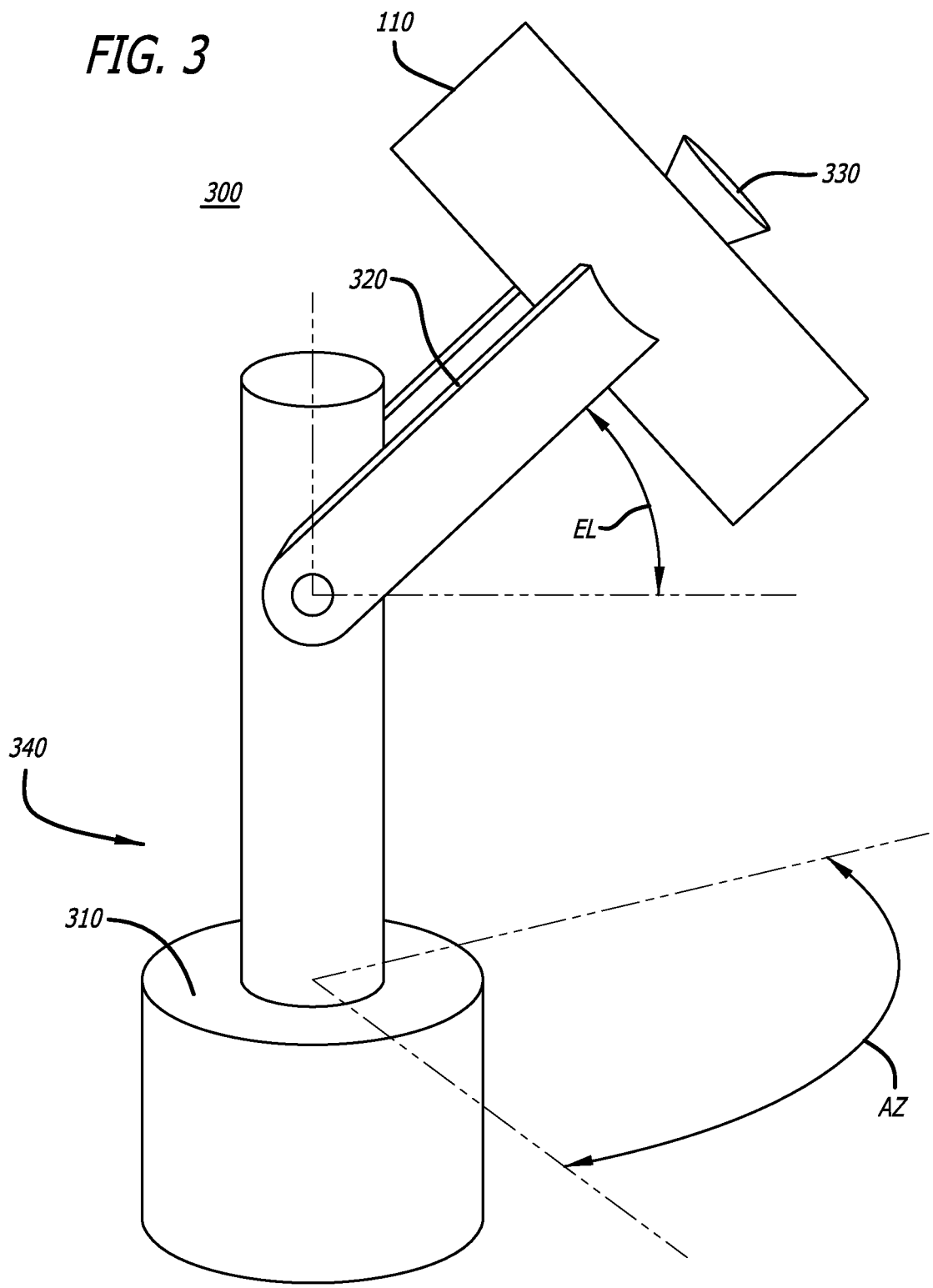
FIG. 3 is a diagram showing the detector mounted on an automation platform, in accordance with at least one embodiment of the present disclosure.

FIG. 3 is a diagram 300 showing the detector 110 mounted on an automation platform 340, in accordance with at least one embodiment of the present disclosure. In this figure, the detector 110, comprising an antenna 330, is shown to be mounted on an automation platform 340, which is capable of gimballing the detector 110 in the azimuth (AZ) and elevation (EL) directions. The gimballing of the detector 110 allows for the antenna 330 of the detector 110 to scan an area(s) during operation. In particular, the automation platform 340 comprises a base 310 and a mounting bracket 320. The detector 110 is mounted onto the mounting bracket 320 of the automation platform 340. The mounting bracket 320 is able to swivel around horizontally in relation to the base 310 to gimbal the detector 110 in azimuth, and the mounting bracket 320 is able to move vertically to gimbal the detector 110 in elevation. It should be noted that FIG. 3 illustrates only one example of a mounting platform (e.g., automation platform 340) that may be employed by the disclosed system for the mounting of the disclosed detector 110.

The antenna 330 of the detector 110 shown in FIG. 3 is a transmit and receive direct radiating horn. However, it should be noted that in other embodiments, the detector 110 may comprise separate transmit and receive antennas, rather than a combined transmit and receive antenna 330, as is shown. Also, in other embodiments, various different types of antennas may be employed for the antenna(s) of the detector 110 including, and not limited to, reflector antennas and array antennas.

In addition, it should be noted that in some embodiments, the antenna 330 may be a transmit antenna, receive antenna, and/or transmit and receive antenna that has its own gimballing capability, such as a phased array antenna. For these embodiments, the mounting platform employed by the disclosed system does not need to have a gimballing capability because the antenna(s) has the capability to scan itself.

Figure 4:
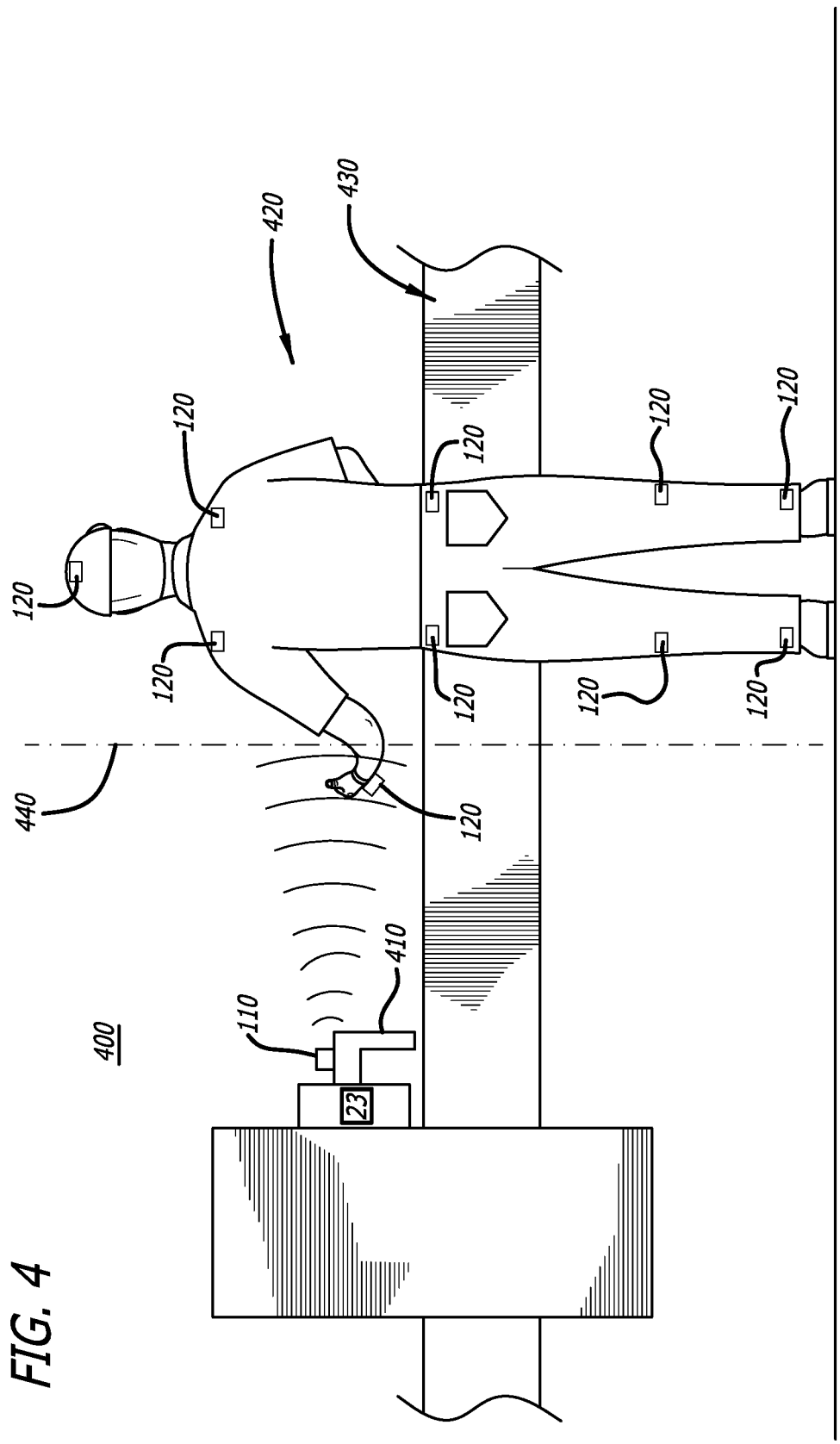
FIG. 4 is a diagram showing the disclosed system using a detector and reflectors for automation cell safety, in accordance with at least one embodiment of the present disclosure.

FIG. 4 is a diagram showing the disclosed system 400 using a detector 110 and reflectors 120 for automation cell safety, in accordance with at least one embodiment of the present disclosure. In particular, this figure illustrates an embodiment where a plurality of reflectors 120 are employed on a user 420 for determining if the user 420 is working too close to dangerous machinery. In this figure, a user (e.g., worker, such as a technician or engineer) 420 is shown to be working by a conveyor belt 430 of a milling machine (e.g., milling machine with serial number 23) 410 in a factory environment. A plurality of reflectors 120 (e.g., refer to reflector 120 of FIG. 2) are shown to be integrated into various pieces of clothing and accessories of the user 420. In particular, the reflectors 120 are integrated into the shirt, pants, hat, and wristband of the user 420. In addition, the detector 110 is shown to be mounted in close proximity to the drill of the milling machine 410.

During operation of the disclosed system 400, the detector 110 transmits an interrogation signal(s) (e.g., refer to interrogation signal(s) 130 of FIG. 1) comprising a frequency ($f_O$) away from the milling machine 410. The reflectors 120 on the user 420 receive the interrogation signals(s). When the interrogation signal(s) hits the reflectors 120, the non-linear devices (e.g., refer to 220 of FIG. 2) of the reflectors 120 resonate at the interrogation signal(s) frequency ($f_O$) and generate response signals (e.g., refer to response signal(s) 140 of FIG. 1) comprising a harmonic frequency ($nf_O$, where n is an integer), which is a multiple of the specific frequency ($f_O$) of the interrogation signal(s).

After the reflectors 120 generate the response signals comprising a harmonic frequency, the detector 110 receives the response signals. At least one processor (e.g., refer to 170 of FIG. 1) of the detector 110 determines the locations of the reflectors 120 by using the response signals. In particular, the processor(s) determines the locations of the reflectors 120 by using the time of arrival (TOA) of the response signals (e.g., the difference in time from when the interrogation signal(s) was transmitted from the detector 110 and when the response signals were received by the detector 110) and/or by using the amplitude of the response signals as received by detector 110.

After the processor(s) determines the locations of the reflectors 120, the processor(s) determines whether any of the reflectors 120 on the user 420 are located within a threshold distance 440 away from the milling machine 410 (which is at a known location) by using the locations of the reflectors 120. In this figure, the reflector 120 located on a wrist strap worn by the user 420 is shown to be located within the threshold distance 440 away from the milling machine 410 (e.g., the reflector 120 on a wrist strap worn by the user 420 is located within a danger zone of the milling machine 410). As such, the processor(s) will determine that one of the reflectors 120 on the user 420 is indeed located within the threshold distance 440 away from the milling machine 410.

In one or more embodiments, when the processor(s) determines that at least one of the reflectors 120 on the user 420 is located within the threshold distance 440 away from the milling machine 410, the processor(s) generates a warning signal indicating that at least one reflector 120 on a user 420 is located near the milling machine 410. Then, a display will display the warning signal (e.g., the information contained within the warning signal) indicating that at least one reflector 120 on the user 420 is located near the milling machine 410.

It should be noted that, in one or more embodiments, each of the reflectors 120 on the user 420 could be designed to generate a response signal(s) comprising a different harmonic frequency ($nf_O$) from one another to allow for the identification of each of the reflectors 120.

Figure 5:
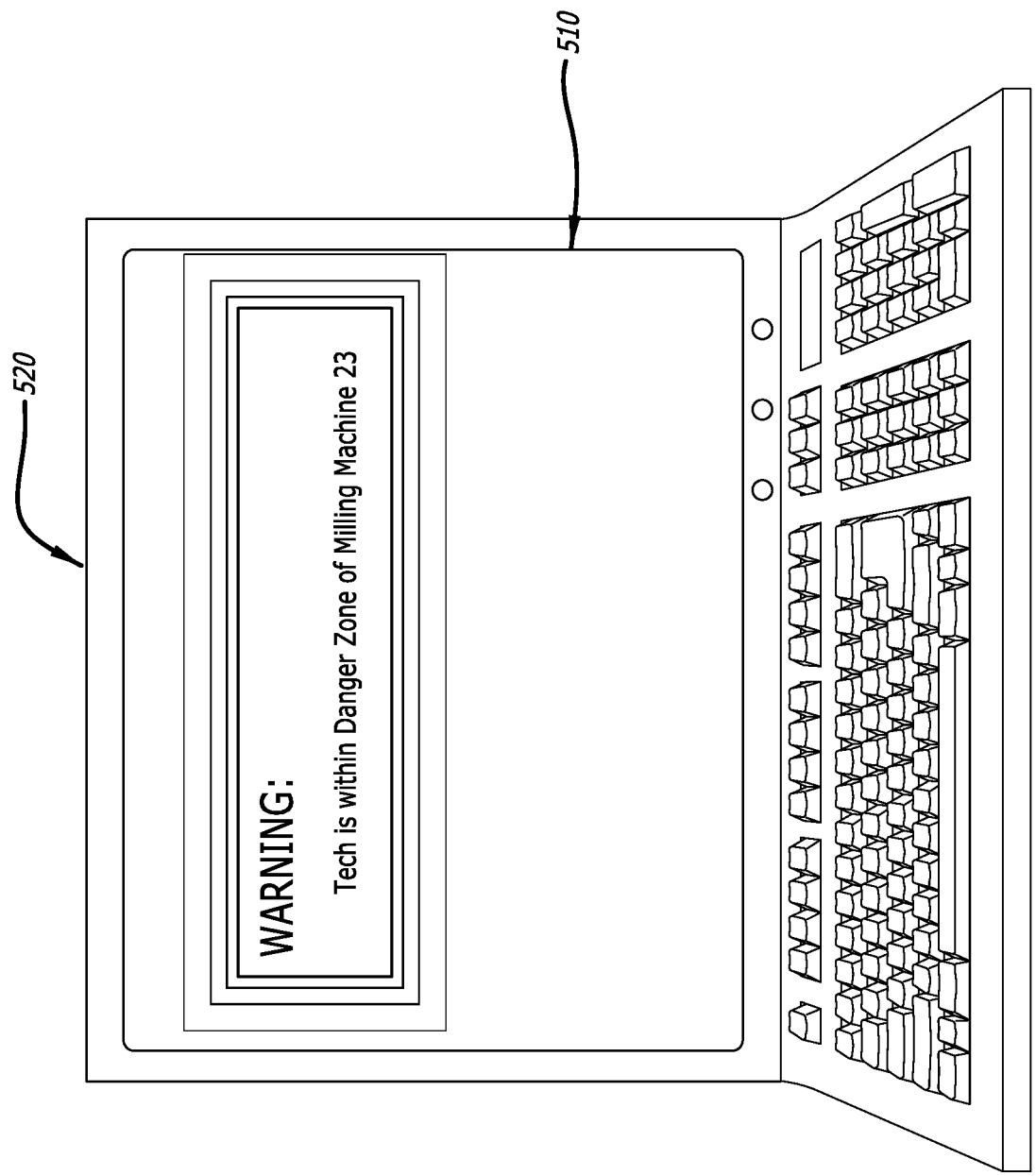
FIG. 5 is a diagram showing a display displaying a warning regarding a user being located near machinery that is not operating, in accordance with at least one embodiment of the present disclosure.

FIG. 5 is a diagram 500 showing a display 510 displaying a warning regarding a user being located near machinery that is not operating, in accordance with at least one embodiment of the present disclosure. In particular, in this figure, a display 510 of a computing device 520 is displaying a warning (e.g., information from a warning signal) stating that a tech (e.g., technician) is located within a danger zone of milling machine 23 (e.g., refer to milling machine 410 of FIG. 4).

Referring back to the operation of the disclosed system of FIG. 4, in some embodiments, the processor(s) will determine whether the milling machine 410 is operating. For these embodiments, when the processor(s) determines that at least one of the reflectors 120 on the user 420 is located within the threshold distance 440 away from the milling machine 410 and that the milling machine 410 is operating, the processor(s) will generate a safety command signal to command the milling machine 410 to slow down its operating speed or to completely stop operating. And, when the processor(s) determines that at least one of the reflectors 120 on the user 420 is located within the threshold distance 440 away from the milling machine 410 and that the milling machine 410 is not operating, the processor(s) will generate a warning signal indicating that at least one reflector 120 on the user 420 is located near the milling machine 410, which is not operating. Then, a display 510 (e.g., refer to FIG. 5) will display the warning signal (e.g., the information contained within the warning signal) indicating that at least one reflector 120 on the user 420 is located near the milling machine 410 that is not operating.

Figure 6:
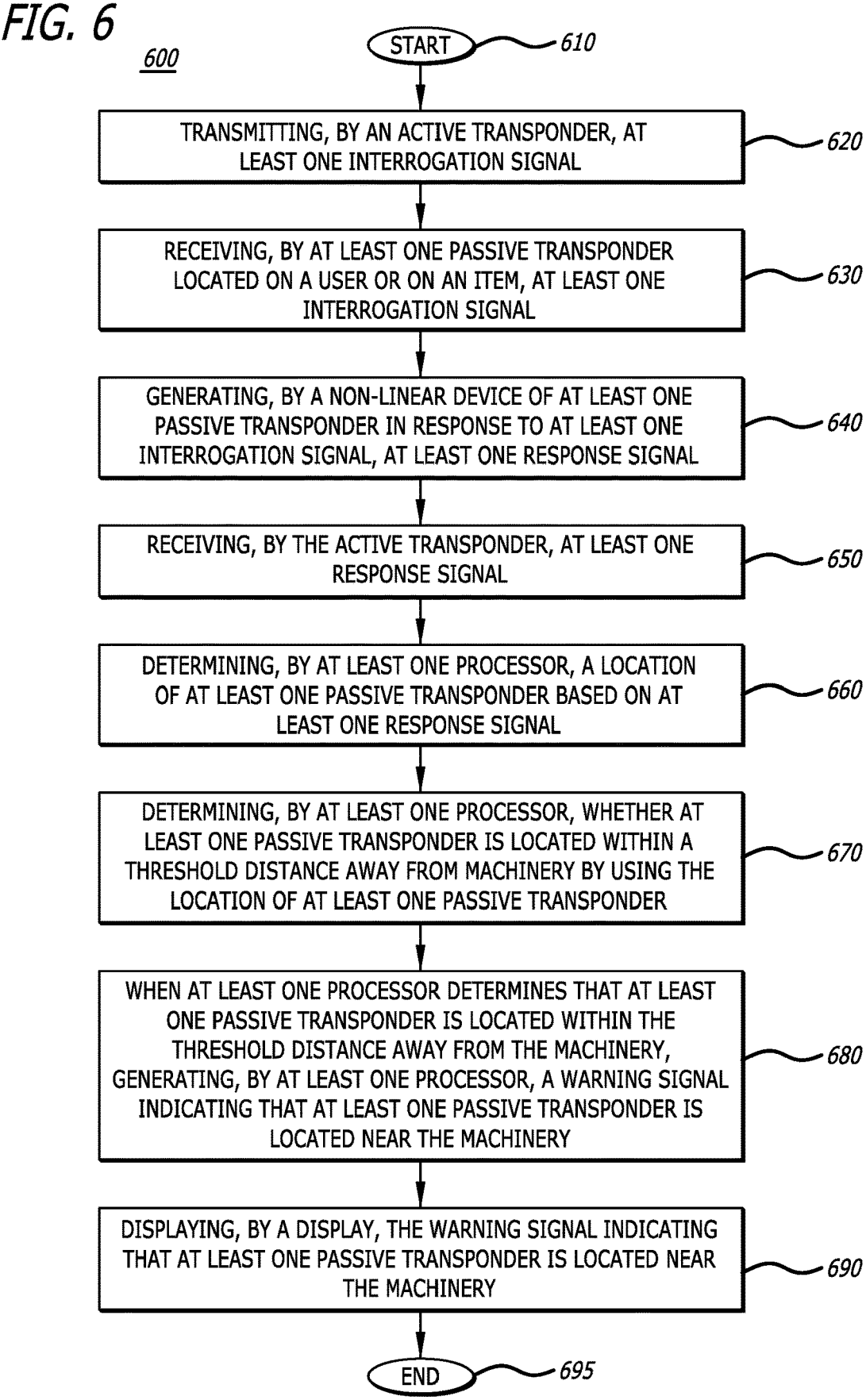
FIG. 6 is a flow chart showing the disclosed method using detectors and reflectors for automation cell safety, where a warning signal is displayed when it is determined that at least one reflector is located within a threshold distance away from machinery, in accordance with at least one embodiment of the present disclosure.

FIG. 6 is a flow chart showing the disclosed method 600 using detectors and reflectors for automation cell safety, where a warning signal is displayed when it is determined that at least one reflector is located within a threshold distance away from machinery, in accordance with at least one embodiment of the present disclosure. At the start 610 of the method 600, an active transponder (e.g., detector) transmits at least one interrogation signal 620. Then, at least one passive transponder (e.g., at least one reflector) located on a user or on an item, receives at least one interrogation signal 630. A non-linear device of at least one passive transponder, in response to at least one interrogation signal, then generates at least one response signal 640. Then, the active transponder receives at least one response signal 650.

At least one processor then determines a location of at least one passive transponder based on at least one response signal 660. Then, at least one processor determines whether at least one passive transponder is located within a threshold distance away from the machinery by using the location of at least one passive transponder 670. When at least one processor determines that at least one passive transponder is located within the threshold distance away from the machinery, at least one processor generates a warning signal indicating that at least one passive transponder is located near the machinery 680. Then, a display displays the warning signal (e.g., information contained within the warning signal) indicating that at least one passive transponder is located near the machinery 690. Then, the method 600 ends 695.

Figure 7:
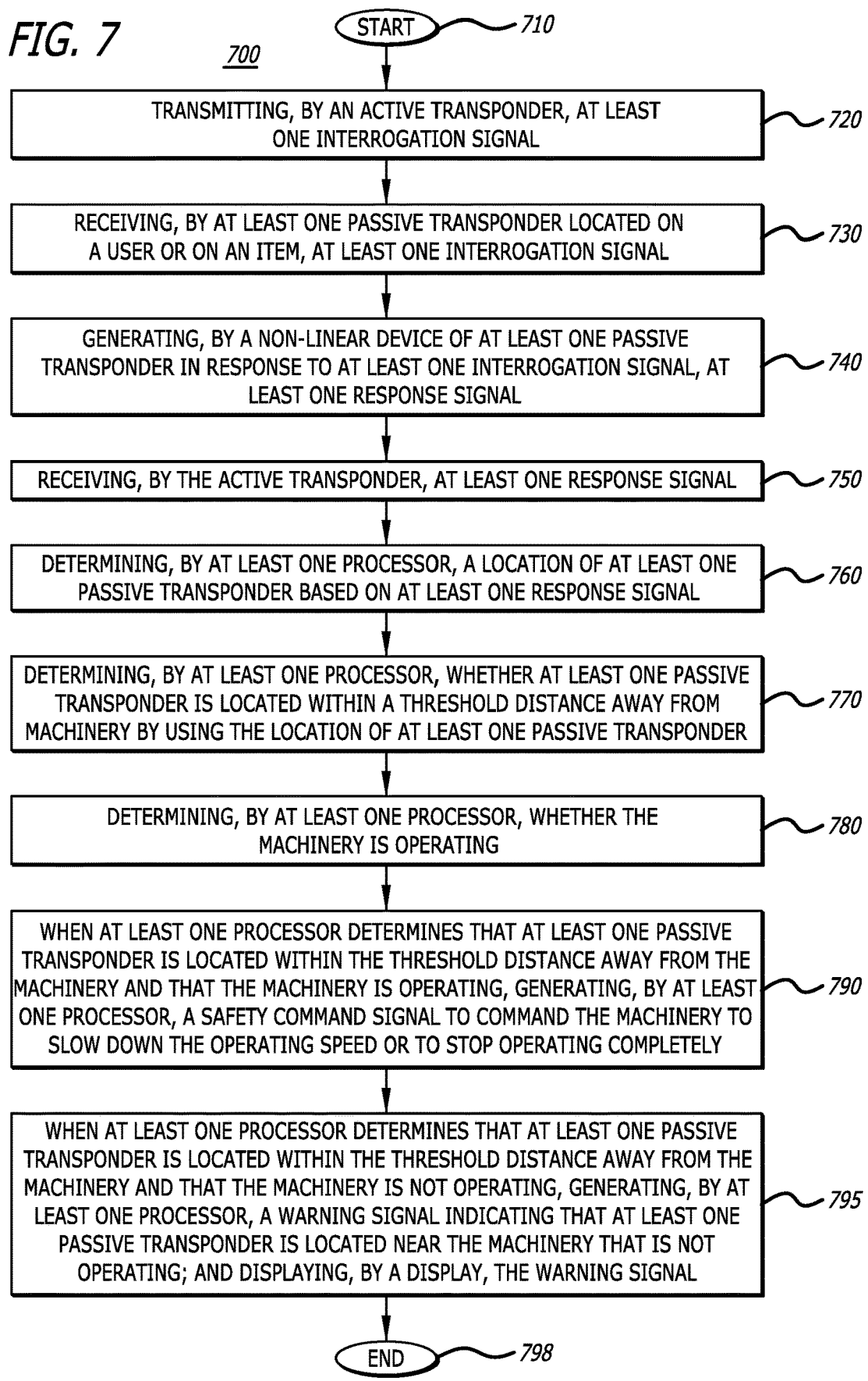
FIG. 7 is a flow chart showing the disclosed method using detectors and reflectors for automation cell safety, where machinery is commanded to slow down its operational speed or to stop operating completely when it is determined that at least one reflector is located within a threshold distance away from the machinery, in accordance with at least one embodiment of the present disclosure.

FIG. 7 is a flow chart showing the disclosed method 700 using detectors and reflectors for automation cell safety, where machinery is commanded to slow down its operational speed or to stop operating completely when it is determined that at least one reflector is located within a threshold distance away from the machinery, in accordance with at least one embodiment of the present disclosure. At the start 710 of the method 700, an active transponder (e.g., detector) transmits at least one interrogation signal 720. Then, at least one passive transponder (e.g., at least one reflector) located on a user or on an item, receives at least one interrogation signal 730. A non-linear device of at least one passive transponder, in response to at least one interrogation signal, then generates at least one response signal 740. Then, the active transponder receives at least one response signal 750.

At least one processor then determines a location of at least one passive transponder based on at least one response signal 760. Then, at least one processor determines whether at least one passive transponder is located within a threshold distance away from the machinery by using the location of at least one passive transponder 770. At least one processor determines whether the machinery is operating 780.

When at least one processor determines that at least one passive transponder is located within the threshold distance away from the machinery and that the machinery is operating, at least one processor generates a safety command signal to command the machinery to slow down the operating speed or to stop operating completely 790. And, when at least one processor determines that at least one passive transponder is located within the threshold distance away from the machinery and that the machinery is not operating, at least one processor generates a warning signal indicating that at least one passive transponder is located near the machinery that is not operating; and a display displays the warning signal (e.g., information contained within the warning signal) 795. Then, the method 700 ends 798.

Figure 8:
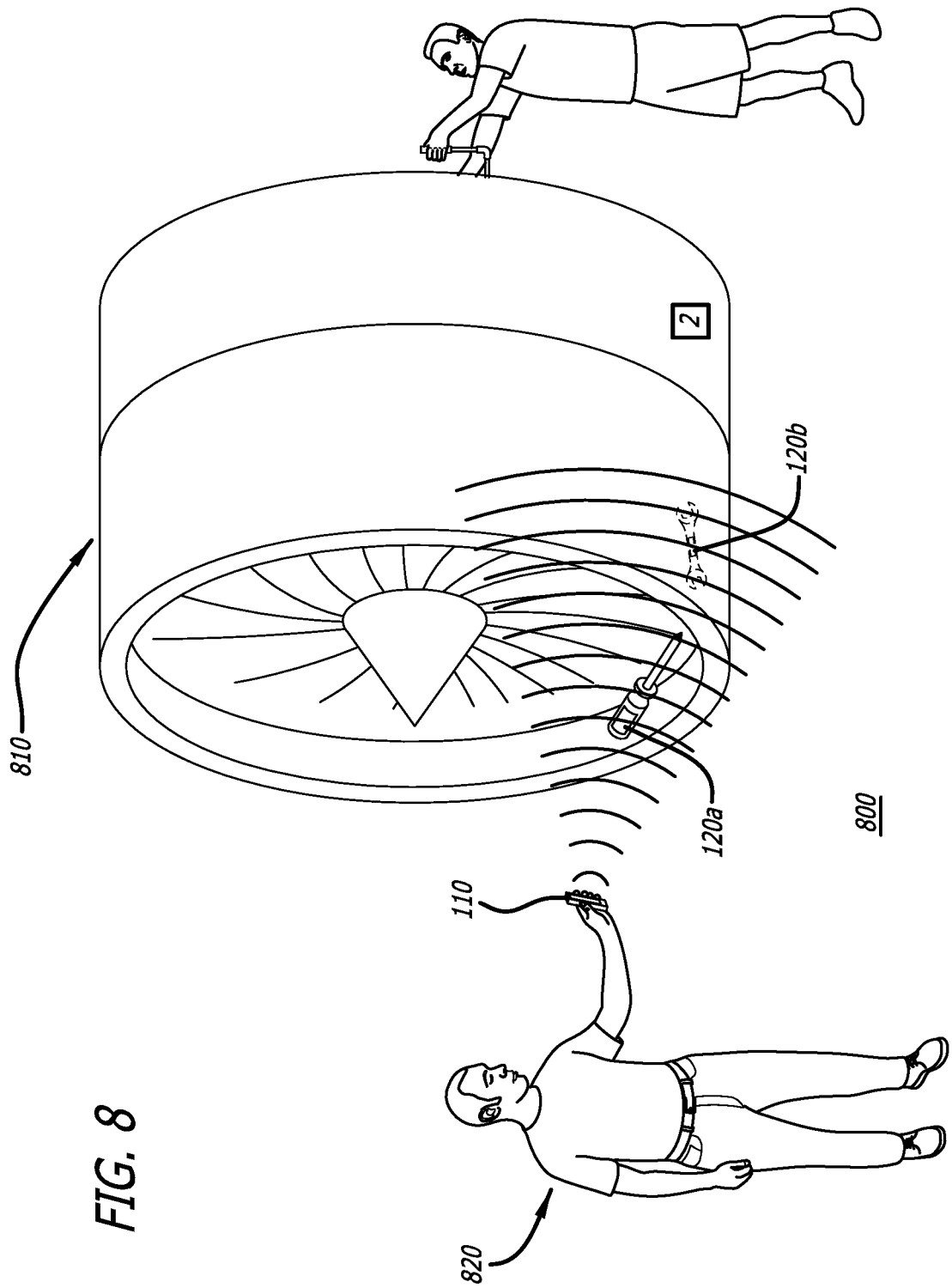
FIG. 8 is a diagram of the disclosed system using a detector and reflectors for locating and identifying items in machinery, in accordance with at least one embodiment of the present disclosure.

FIG. 8 is a diagram of the disclosed system 800 using a detector 110 and reflectors 120a, 120b for locating and identifying items in machinery, in accordance with at least one embodiment of the present disclosure. In particular, this figure illustrates an embodiment where reflectors 120a, 120b are attached to tools for identifying and determining if any of the tools are mistakenly left within machinery. In this figure, reflector 120a is attached to one of the two tools (e.g., a screwdriver, which for example is assigned tool identification (ID) number 5762), and reflector 120b is attached to the other tool (e.g., a wrench, which for example is assigned tool ID number 3195). Each of the reflectors 120a, 120b is designed to generate a response signal(s) comprising a different harmonic frequency ($nf_o$) from one another in order to be able to identify the tool associated with the reflector 120a, 120b that is generating the response signal(s) detected by the detector 110. The two tools (e.g., the screwdriver and the wrench) are shown to be located within a turbine engine (e.g., turbine number two) 810. A user (e.g., a technician) 820 is holding the detector 110, and aiming the detector 110 such that the detector 110 transmits and receives signals towards and from the turbine engine 810.

During operation of the disclosed system 800, the detector 110 transmits an interrogation signal(s) (e.g., refer to interrogation signal(s) 130 of FIG. 1) comprising a frequency ($f_o$) towards the turbine engine 810. The reflectors 120a, 120b on the tools receive the interrogation signals(s). When the interrogation signal(s) hits the reflectors 120a, 120b, the non-linear devices (e.g., refer to 220 of FIG. 2) of the reflectors 120a, 120b resonate at the interrogation signal(s) frequency ($f_o$) and generate response signals (e.g., refer to response signal(s) 140 of FIG. 1) comprising different harmonic frequencies, which are each a multiple of the specific frequency ($f_o$) of the interrogation signal(s) (e.g., reflector 120a generates a response signal(s) that comprises a frequency ($2f_o$) that is double the interrogation signal(s) frequency ($f_o$), and reflector 120b generates a response signal(s) that comprises a frequency ($3f_o$) that is triple the interrogation signal(s) frequency ($f_o$)).

After the reflectors 120a, 120b generate the response signals comprising the different harmonic frequencies, the detector 110 receives the response signals. At least one processor (e.g., refer to 170 of FIG. 1) of the detector 110 determines the locations of the reflectors 120a, 120b by using the response signals. In particular, the processor(s) determines the locations of the reflectors 120a, 120b by using the time of arrival (TOA) of the response signals (e.g., the difference in time from when the interrogation signal(s) was transmitted from the detector 110 and when the response signals were received by the detector 110) and/or by using the amplitude of the response signals as received by detector 110.

After the processor(s) determines the locations of the reflectors 120a, 120b, the processor(s) determines whether any of the reflectors 120a, 120b are located within the turbine engine 810 (note that it is assumed that the processor(s) knows the location of the turbine engine 810) by using the locations of the reflectors 120a, 120b. In this figure, the reflectors 120a, 120b are shown to both be located within the turbine engine (e.g., turbine engine number two) 810. As such, the processor(s) will determine that the reflectors 120a, 120b are both located within turbine engine 810.

After the processor(s) determines that the reflectors 120a, 120b are located within the turbine engine 810, the processor(s) will determine the identification of the tools associated with each of the reflectors 120a, 120b located within the turbine engine 810 by using the frequencies of the response signals generated from the reflectors 120a, 120b that the detector 110 detected. In one or more embodiments, the processor(s) will access a lookup table (e.g., stored in a database, such as database 1932 of FIG. 19) to look up which specific tool is associated with the reflector 120a, 120b that generated a specific response signal frequency (e.g., the lookup table will indicate that reflector 120a, which is designed to generate response signals comprising a frequency that is double the interrogation signal(s) frequency, is associated with a screwdriver having tool ID number 5762; and that reflector 120b, which is designed to generate response signals comprising a frequency that is triple the interrogation signal(s) frequency, is associated with a wrench having tool ID number 3195). As such, the processor(s) will determine that tool 5762 and tool 3195 are located within the turbine engine (e.g., turbine engine number two) 810.

In one or more embodiments, when the processor(s) determines that tool 5762 and tool 3195 are located within the turbine engine (e.g., turbine engine number two) 810, the processor(s) generates a warning signal(s) indicating that tool 5762 and tool 3195 are located within the turbine engine (e.g., turbine engine number two) 810. Then, a display will display the warning signal(s) (e.g., the information contained within the warning signal(s)) indicating that tool 5762 and tool 3195 are located within the turbine engine (e.g., turbine engine number two) 810.

Figure 9:
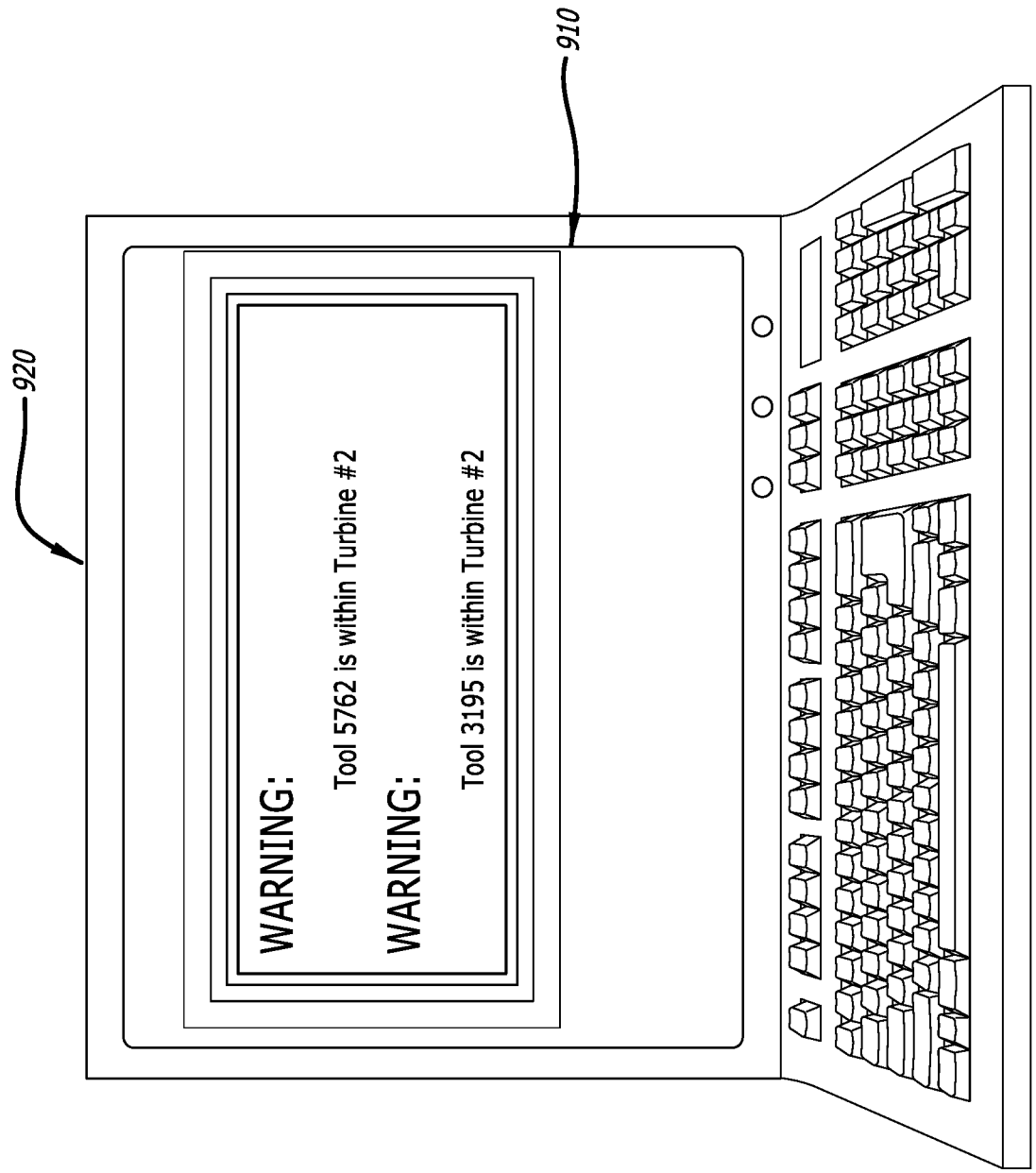
FIG. 9 is a diagram showing a display displaying warnings regarding items located within machinery, in accordance with at least one embodiment of the present disclosure.

FIG. 9 is a diagram 900 showing a display 910 displaying warnings regarding items located within machinery, in accordance with at least one embodiment of the present disclosure. In particular, in this figure, a display 910 of a computing device 920 is displaying warnings (e.g., information from warning signals) stating that tool 5762 and tool 3195 are located within turbine engine number two (#2) (e.g., refer to turbine engine 810 of FIG. 8).

Figure 10:
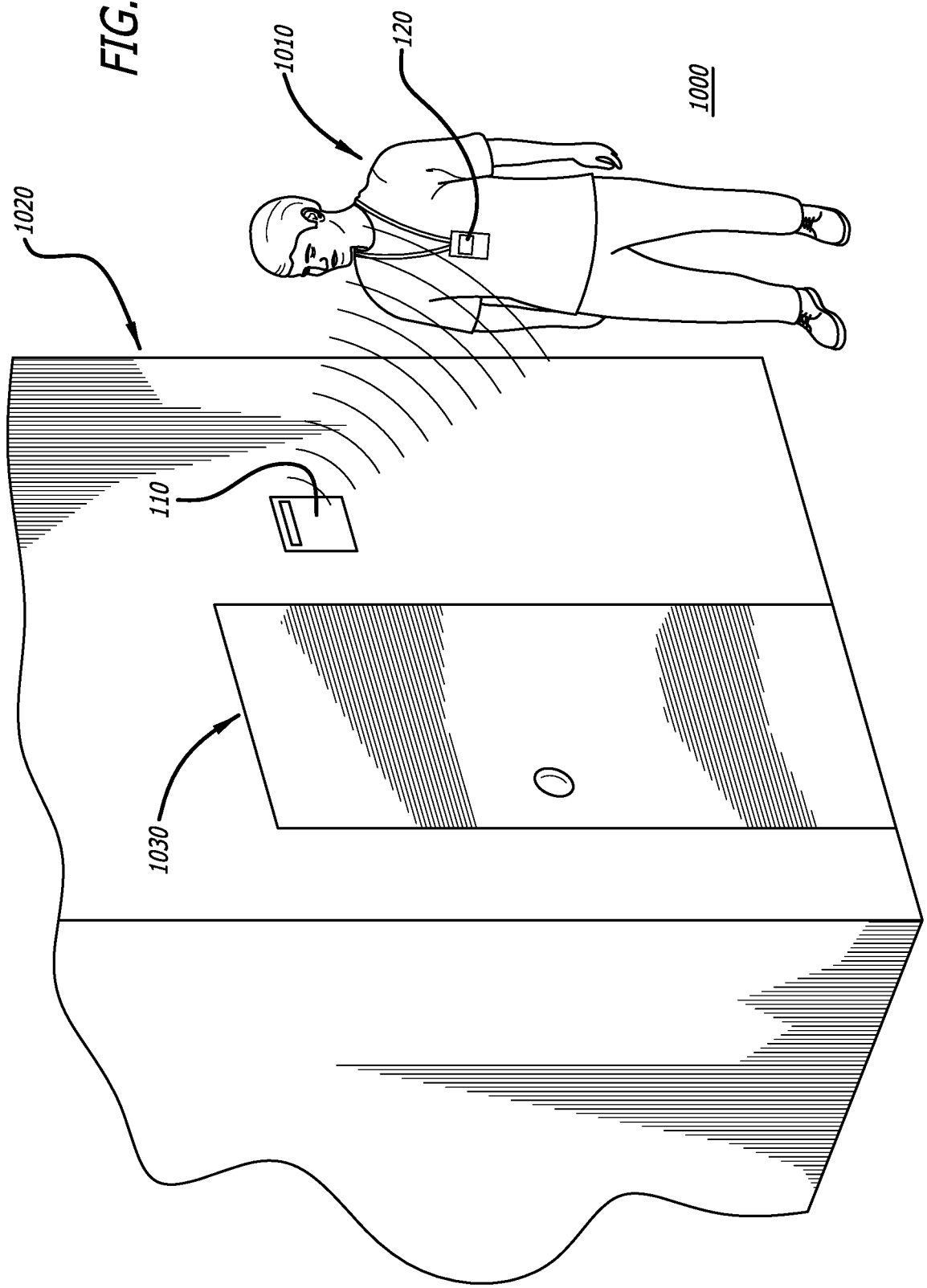
FIG. 10 is a diagram showing the disclosed system using a detector and reflector for identification of a user for user access, in accordance with at least one embodiment of the present disclosure.

FIG. 10 is a diagram showing the disclosed system 1000 using a detector 110 and reflector 120 for identification of a user 1010 for user access, in accordance with at least one embodiment of the present disclosure. In particular, this figure illustrates an embodiment where a reflector 120 is associated with a user 1010 for identifying the user 1010 to determine whether the user 1010 is authorized for access into a secure facility 1020. In this figure, a reflector 120 is embedded within a badge that is worn by the user 1010. The reflector 120 is designed to generate a response signal(s) comprising a unique harmonic frequency that is not generated by any other reflectors that are associated with other users. The detector 110 is shown to be located near a locked external door 1030 of the secure facility 1020 that the user 1010 is attempting to enter.

During operation of the disclosed system 1000, the detector 110 transmits an interrogation signal(s) (e.g., refer to interrogation signal(s) 130 of FIG. 1) comprising a frequency ($f_o$) towards the user 1010. The reflector 120 on the user 1010 receives the interrogation signals(s). When the interrogation signal(s) hits the reflector 120, the non-linear device (e.g., refer to 220 of FIG. 2) of the reflector 120 resonates at the interrogation signal(s) frequency ($f_o$) and generates a response signal(s) (e.g., refer to response signal(s) 140 of FIG. 1) comprising a unique harmonic frequency, which is a multiple of the specific frequency ($f_o$) of the interrogation signal(s) (e.g., the reflector 120 generates a response signal(s) that comprises a frequency ($2f_o$) that is double the interrogation signal(s) frequency ($f_o$)).

After the reflector 120 generates the response signal(s) comprising the unique harmonic frequency, the detector 110 receives the response signal(s). Then, at least one processor (e.g., refer to 170 of FIG. 1) of the detector 110 determines the identification of the user 1010 associated with the reflector 120 by using the frequency of the response signal(s) generated from the reflector 120 that the detector 110 detected. In at least one embodiment, the processor(s) will access a lookup table (e.g., stored in a database, such as database 1932 of FIG. 19) to look up which specific user is associated with the reflector 120 that generated a specific response signal frequency (e.g., the lookup table will indicate that reflector 120, which is designed to generate response signals comprising a frequency that is double the interrogation signal(s) frequency, is associated with user 1010). The processor(s) will then determine whether the particular user 1010 associated with reflector 120 is authorized for access into the secure facility 1020 by using the identification of the user 1010. In one or more embodiments, the processor(s) will view a lookup table to determine whether the user 1010 is authorized for access into secure facility 1020 (e.g., the lookup table will indicate that user 1010 is specifically authorized for access into secure facility 1020). As such, after referring to the lookup table, the processor(s) will determine that user 1010 is authorized for access into secure facility 1020.

In one or more embodiments, when the processor(s) determines that user 1010 is authorized for access into secure facility 1020, the processor(s) will generate an access command signal to allow access of the user 1010 into the secure facility 1020 (e.g., the access command signal will cause the door 1030 of the secure facility 1020 to unlock to allow for the user 1010 to enter into the secure facility 1020).

Figure 11:
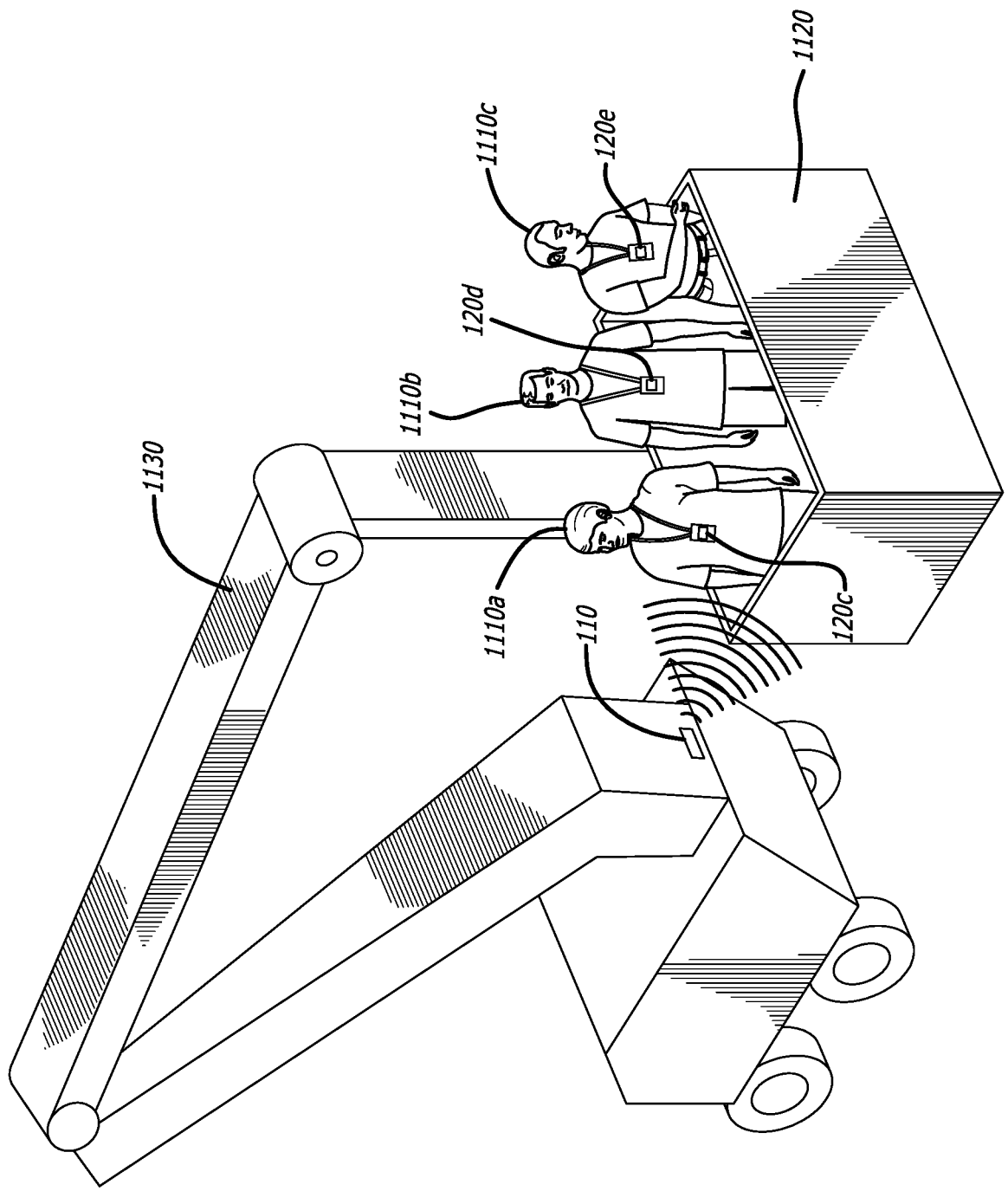
FIG. 11 is a diagram showing the disclosed system using a detector and reflectors for identification of users for determining the number of users, in accordance with at least one embodiment of the present disclosure.

FIG. 11 is a diagram showing the disclosed system 1100 using a detector 110 and reflectors 120c, 120d, 120e for identification of users 1110a, 1110b, 1110c for determining the number of users 1110a, 1110b, 1110c, in accordance with at least one embodiment of the present disclosure. In particular, this figure illustrates an embodiment where reflectors 120c, 120d, 120e are worn by users 1110a, 1110b, 1110c for identifying and determining if too many users 1110a, 1110b, 1110c are located on a structure 1120 (e.g., for determining whether there are too many users 1110a, 1110b, 1110c on the structure 1120 such that the weight of the users 1110a, 1110b, 1110c on the structure 1120 is too great for the structure 1120 to withstand). In this figure, reflectors 120c, 120d, 120c are embedded within badges worn by the users 1110a, 1110b, 1110c, who are located on a structure 1120 attached to a crane 1130. Each of the reflectors 120c, 120d, 120e is designed to generate a response signal(s) comprising a different harmonic frequency ($nf_o$) from one other in order to be able to identify the specific user associated with the reflector 120c, 120d, 120e that is generating the response signal(s) detected by the detector 110. The detector 110 is shown to be located on the crane 1130, and is positioned such that the detector 110 transmits and receives signals towards and from the structure 1120.

During operation of the disclosed system 1100, the detector 110 transmits an interrogation signal(s) (e.g., refer to interrogation signal(s) 130 of FIG. 1) comprising a frequency ($f_o$) towards the structure 1120. The reflectors 120c, 120d, 120e on the users 1110a, 1110b, 1110c receive the interrogation signals(s). When the interrogation signal(s) hits the reflectors 120c, 120d, 120e, the non-linear devices (e.g., refer to 220 of FIG. 2) of the reflectors 120c, 120d, 120e resonate at the interrogation signal(s) frequency ($f_o$) and generate response signals (e.g., refer to response signal(s) 140 of FIG. 1) comprising different harmonic frequencies, which are each a multiple of the specific frequency ($f_o$) of the interrogation signal(s) (e.g., reflector 120c generates a response signal(s) that comprises a frequency ($2f_o$) that is double the interrogation signal(s) frequency ($f_o$); reflector 120d generates a response signal(s) that comprises a frequency ($3f_o$) that is triple the interrogation signal(s) frequency ($f_o$); and reflector 120e generates a response signal(s) that comprises a frequency ($4f_o$) that is four times the interrogation signal(s) frequency ($f_o$)).

After the reflectors 120c, 120d, 120e generate the response signals comprising the different harmonic frequencies, the detector 110 receives the response signals. At least one processor (e.g., refer to 170 of FIG. 1) of the detector 110 determines the identification of the user associated with each of the reflectors 120c, 120d, 120e located on the structure 1120 by using the frequencies of the response signals generated from the reflectors 120c, 120d, 120e that the detector 110 detected. In one or more embodiments, the processor(s) will access a lookup table (e.g., stored in a database, such as database 1932 of FIG. 19) to look up which specific user is associated with the reflector 120c, 120d, 120e that generated a specific response signal frequency (e.g., the lookup table will indicate that reflector 120c, which is designed to generate response signals comprising a frequency that is double the interrogation signal(s) frequency, is associated with user 1110a; that reflector 120d, which is designed to generate response signals comprising a frequency that is triple the interrogation signal(s) frequency, is associated with user 1110b; and that reflector 120e, which is designed to generate response signals comprising a frequency that is four times the interrogation signal(s) frequency, is associated with user 1110c). As such, the processor(s) will determine that users 1110a, 1110b, 1110c are located on structure 1120. It should be noted that one of the reasons the identification of the users is employed by the system 1100 is so that the processor(s) is able to determine that the detected response signals are generated from reflectors associated with users, rather than from reflectors associated with tools, which typically weigh much less than users.

After the processor(s) determines the specific users 1110a, 1110b, 1110c located on structure 1120, the processor(s) will determine the number of users present on the structure 1120 by using the identification of the users 1110a, 1110b, 1110c. As such, the processor(s) will determine that the number of users 1110a, 1110b, 1110c present on the structure 1120 is three. Then, the processor(s) determines whether the number of users 1110a, 1110b, 1110c present on the structure 1120 exceeds a threshold number of users for the structure 1120

(e.g., the threshold number of users to be on structure 1120 may be predetermined to be two). As such, the processor(s) will determine that the number of users 1110*a*, 1110*b*, 1110*c* present on the structure 1120, which is three users, exceeds the threshold number of users for the structure 1120, which is two.

When the processor(s) determines that the number of users 1110*a*, 1110*b*, 1110*c* present on the structure 1120 exceeds the threshold number of users, the processor(s) will generate a warning signal indicating that the number of users 1110*a*, 1110*b*, 1110*c* present on the structure 1120 exceeds the threshold number of users for the structure 1120. As such, since the processor(s) determines that the number of users 1110*a*, 1110*b*, 1110*c* present on the structure 1120 exceeds the threshold number of users for the structure 1120, the processor(s) will generate a warning signal indicating that the number of users 1110*a*, 1110*b*, 1110*c* (e.g., three users) present on the structure 1120 exceeds the threshold number of users (e.g., two users) for the structure 1120. In one or more embodiments, a display will display the warning signal (e.g., the information contained within the warning signal) indicating that the number of users 1110*a*, 1110*b*, 1110*c* (e.g., three users) present on the structure 1120 exceeds the threshold number of users (e.g., two users) for the structure 1120.

Figure 12:
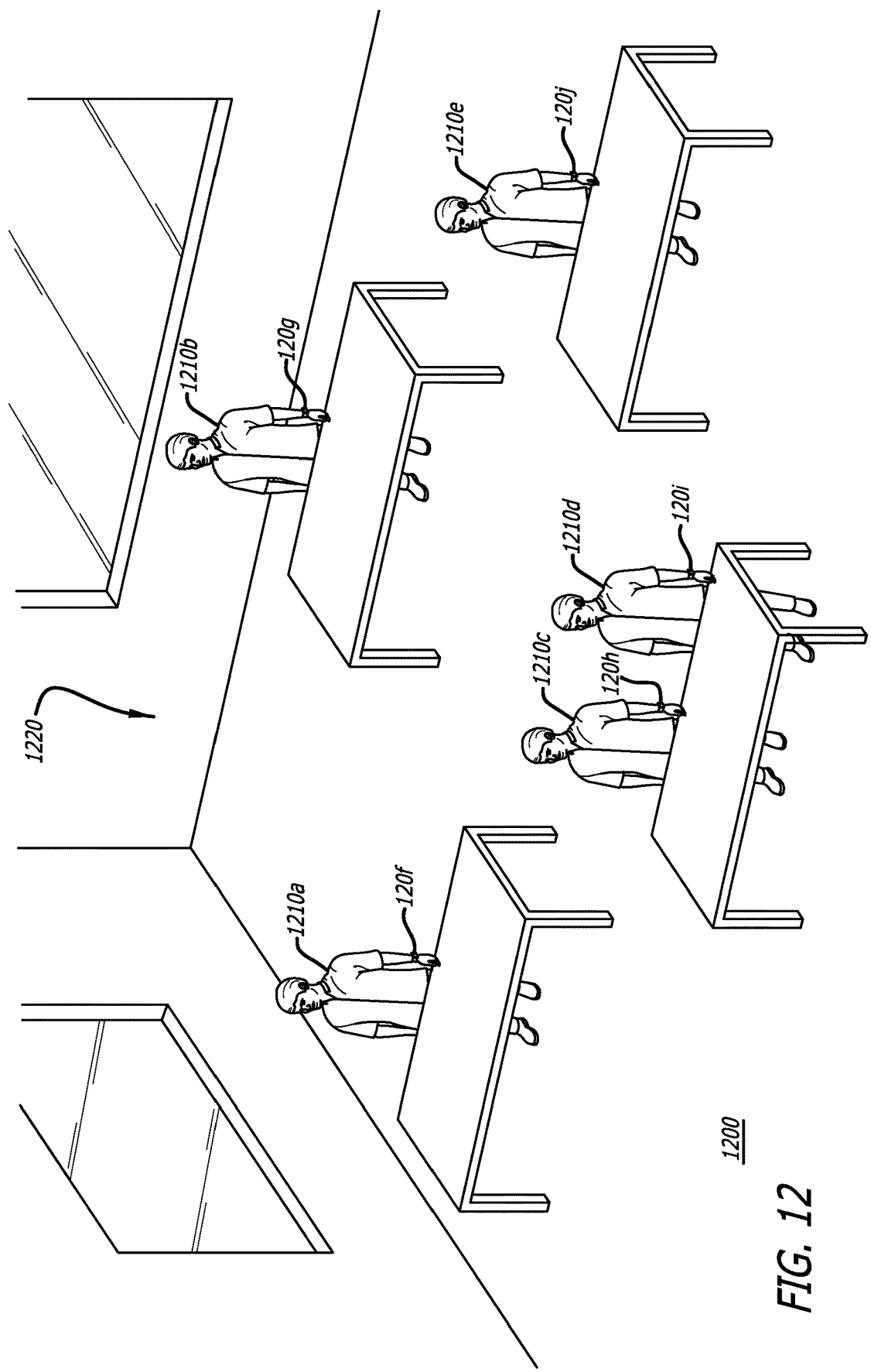
FIG. 12 is a diagram showing the disclosed system using detectors and reflectors for identification of users located within a factory, in accordance with at least one embodiment of the present disclosure.

FIG. 12 is a diagram showing the disclosed system 1200 using detectors and reflectors 120*f*, 120*g*, 120*h*, 120*i*, 120*j* for identification of users 1210*a*, 1210*b*, 1210*c*, 1210*d*, 1210*e* located within a factory 1220, in accordance with at least one embodiment of the present disclosure. In particular, this figure illustrates an embodiment where reflectors 120*f*, 120*g*, 120*h*, 120*i*, 120*j* are worn by users 1210*a*, 1210*b*, 1210*c*, 1210*d*, 1210*e* for identifying and determining the locations of the users 1210*a*, 1210*b*, 1210*c*, 1210*d*, 1210*e* within the factory 1220. In this figure, reflectors 120*f*, 120*g*, 120*h*, 120*i*, 120*j* are embedded within wristbands worn by users 1210*a*, 1210*b*, 1210*c*, 1210*d*, 1210*e*, who are located at various different locations within the factory 1220. Each of the reflectors 120*f*, 120*g*, 120*h*, 120*i*, 120*j* is designed to generate a response signal(s) comprising a different harmonic frequency ($nf_0$) from one other in order to be able to identify the specific user 1210*a*, 1210*b*, 1210*c*, 1210*d*, 1210*e* associated with the reflector 120*f*, 120*g*, 120*h*, 120*i*, 120*j* that is generating the response signal(s) detected by the detector(s).

During operation of the disclosed system 1200, the detector (not shown) transmits an interrogation signal(s) (e.g., refer to interrogation signal(s) 130 of FIG. 1) comprising a frequency ($f_0$) within the factory 1220. The reflectors 120*f*, 120*g*, 120*h*, 120*i*, 120*j* receive the interrogation signals(s). When the interrogation signal(s) hits the reflectors 120*f*, 120*g*, 120*h*, 120*i*, 120*j*, the non-linear devices (e.g., refer to 220 of FIG. 2) of the reflectors 120*f*, 120*g*, 120*h*, 1201, 120*j* resonate at the interrogation signal(s) frequency ($f_0$) and generate response signals (e.g., refer to response signal(s) 140 of FIG. 1) comprising different harmonic frequencies, which are each a multiple of the specific frequency ($f_0$) of the interrogation signal(s).

After the reflectors 120*f*, 120*g*, 120*h*, 120*i*, 120*j* generate the response signals comprising the different harmonic frequencies, the detector receives the response signals. At least one processor (e.g., refer to 170 of FIG. 1) of the detector determines the locations of the reflectors 120*f*, 120*g*, 120*h*, 120*i*, 120*j* within the factory 1220 by using the response signals. In particular, the processor(s) determines the locations of the reflectors 120*f*, 120*g*, 120*h*, 120*i*, 120*j* by using the time of arrival (TOA) of the response signals (e.g., the difference in time from when the interrogation signal(s) was transmitted from the detector and when the response signals were received by the detector) and/or by using the amplitude of the response signals as received by detector.

After the processor(s) determines the locations of the reflectors 120*f*, 120*g*, 120*h*, 120*i*, 120*j* within the factory 1220, the processor(s) determines the identification of the users 1210*a*, 1210*b*, 1210*c*, 1210*d*, 1210*e* associated with each of the reflectors 120*f*, 120*g*, 120*h*, 120*i*, 120*j*. In one or more embodiments, the processor(s) will access a lookup table (e.g., stored in a database, such as database 1932 of FIG. 19) to look up which specific user is associated with the reflector 120*f*, 120*g*, 120*h*, 120*i*, 120*j* that generated a specific response signal frequency. As such, the processor(s) will determine that the user 1210*a* associated with reflector 120*f* has a user ID of u12, the user 1210*b* associated with reflector 120*g* has a user ID of u29, the user 1210*c* associated with reflector 120*h* has a user ID of u54, the user 1210*d* associated with reflector 120*i* has a user ID of u30, and the user 1210*e* associated with reflector 120*j* has a user ID of u48.

In one or more embodiments, after the processor(s) determines the identification of the users 1210*a*, 1210*b*, 1210*c*, 1210*d*, 1210*e* associated with each of the reflectors 120*f*, 120*g*, 120*h*, 120*i*, 120*j* located within the factory 1220, a display will display a mapping of the locations of the users 1210*a*, 1210*b*, 1210*c*, 1210*d*, 1210*e* within the factory 1220 with the identifications (e.g., u12, u29, u54, u30, u48) of the users 1210*a*, 1210*b*, 1210*c*, 1210*d*, 1210*e* denoted on the mapping.

Figure 13:
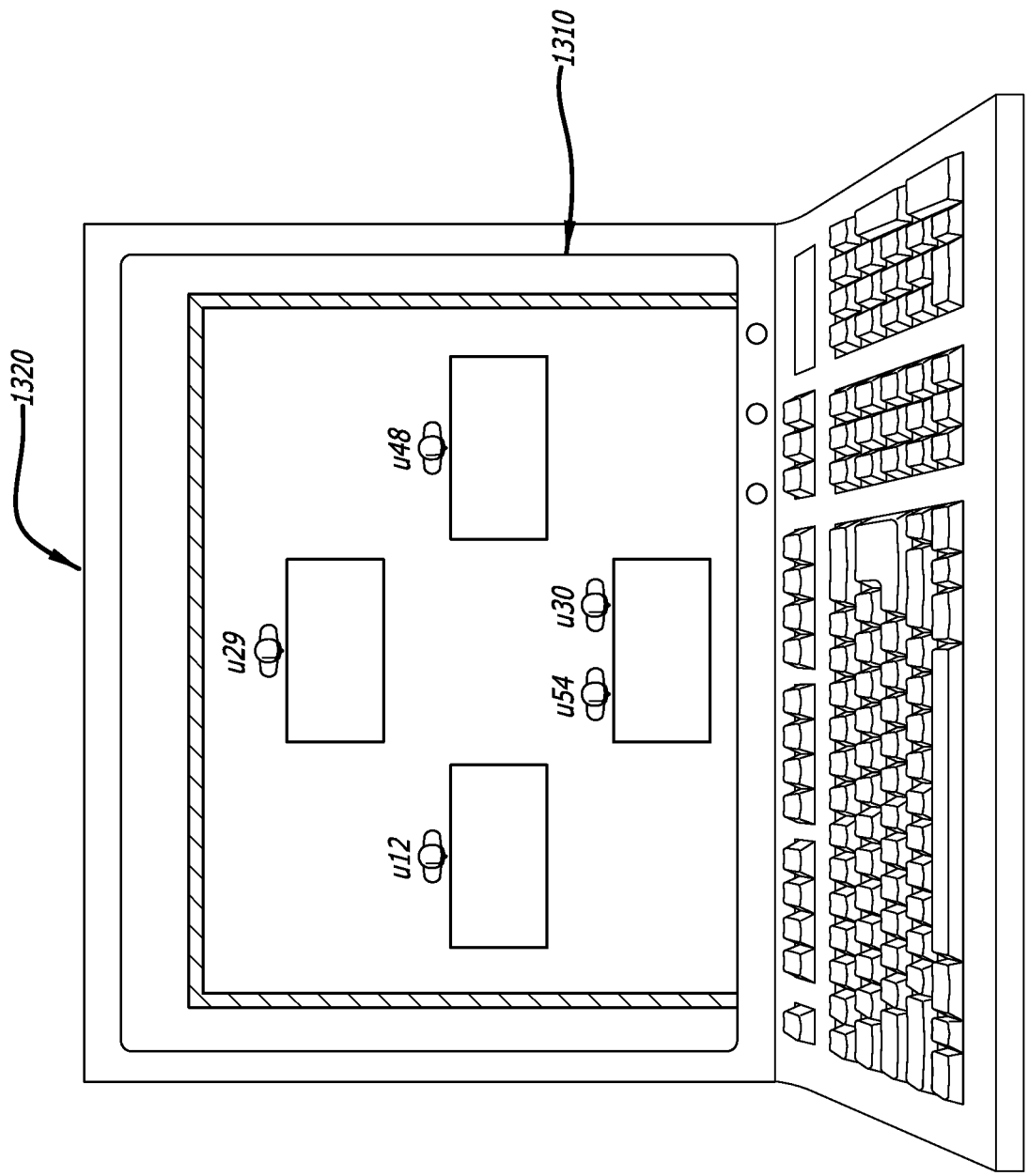
FIG. 13 is diagram of a display displaying an abstract illustration of the users within the factory of FIG. 12, in accordance with at least one embodiment of the present disclosure.

FIG. 13 is diagram 1300 of a display 1320 displaying an abstract illustration of the users 1210*a*, 1210*b*, 1210*c*, 1210*d*, 1210*e* (with their corresponding user identifications of u12, u29, u54, u30, u48 denoted) within the factory 1220 of FIG. 12, in accordance with at least one embodiment of the present disclosure. In particular, in this figure, a display 1310 of a computing device 1320 is displaying a mapping of the locations of the users 1210*a*, 1210*b*, 1210*c*, 1210*d*, 1210*e* within the factory 1220 with the identifications (e.g., u12, u29, u54, u30, u48) of the users 1210*a*, 1210*b*, 1210*c*, 1210*d*, 1210*e* indicated on the mapping.

Figure 14:
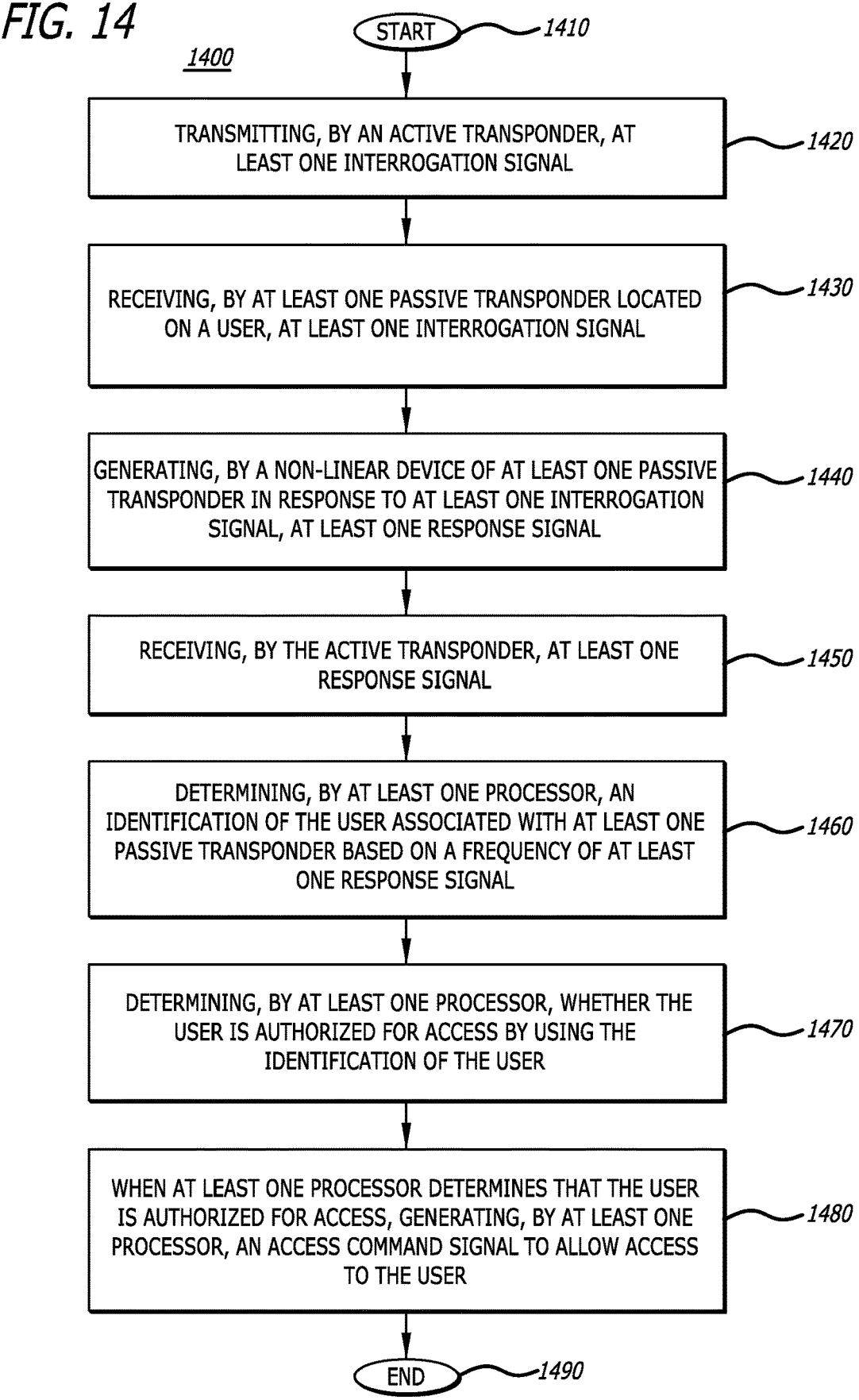
FIG. 14 is a flow chart showing the disclosed method using detectors and reflectors for identification of a user for user access, in accordance with at least one embodiment of the present disclosure.

FIG. 14 is a flow chart showing the disclosed method 1400 using detectors and reflectors for identification of a user for user access, in accordance with at least one embodiment of the present disclosure. At the start 1410 of the method 1400, an active transponder (e.g., detector) transmits at least one interrogation signal 1420. Then, at least one passive transponder (e.g., at least one reflector) located on a user, receives at least one interrogation signal 1430. A non-linear device of at least one passive transponder, in response to at least one interrogation signal, then generates at least one response signal 1440. Then, the active transponder receives at least one response signal 1450.

At least one processor then determines the identification of the user associated with at least one passive transponder based on a frequency of at least one response signal 1460. Then, at least one processor determines whether the user is authorized for access by using the identification of the user 1470. When at least one processor determines that the user is authorized for access, at least one processor generates an access command signal to allow access to the user 1480. Then, the method 1400 ends 1490.

Figure 15:
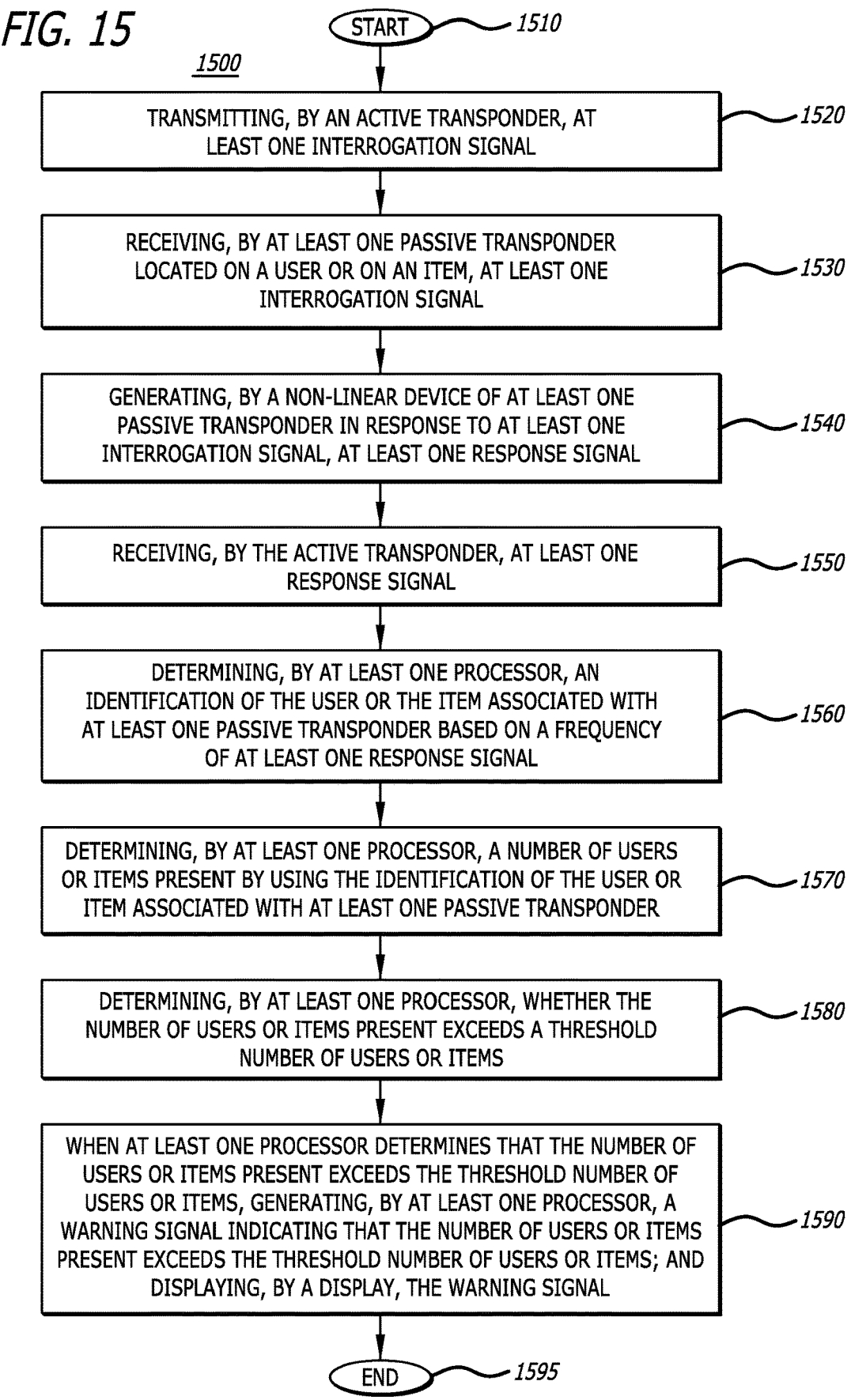
FIG. 15 is a flow chart showing the disclosed method using detectors and reflectors for identification of users for determining the number of users, in accordance with at least one embodiment of the present disclosure.

FIG. 15 is a flow chart showing the disclosed method 1500 using detectors and reflectors for identification of users for determining the number of users, in accordance with at least one embodiment of the present disclosure. At the start 1510 of the method 1500, an active transponder (e.g., detector) transmits at least one interrogation signal 1520. Then, at least one passive transponder (e.g., at least one reflector) located on a user (or on an item), receives at least one interrogation signal 1530. A non-linear device of at least one passive transponder, in response to at least one interrogation signal, then generates at least one response signal 1540. Then, the active transponder receives at least one response signal 1550.

At least one processor then determines the identification of the user (or the item) associated with at least one passive transponder based on a frequency of at least one response signal 1560. Then, at least one processor determines a number of users (or items) present by using the identification of the user (or the item) associated with at least one passive transponder 1570. At least one processor then determines whether the number of users (or items) present exceeds a threshold number of users (or items) 1580. When at least one processor determines that the number of users (or items) present exceeds the threshold number of users (or items), at least one processor generates a warning signal indicating that the number of users present exceeds the threshold number of users (or items); and a display displays the warning signal (e.g., information contained within the warning signal) 1590. Then, the method 1500 ends 1595.

Figure 16:
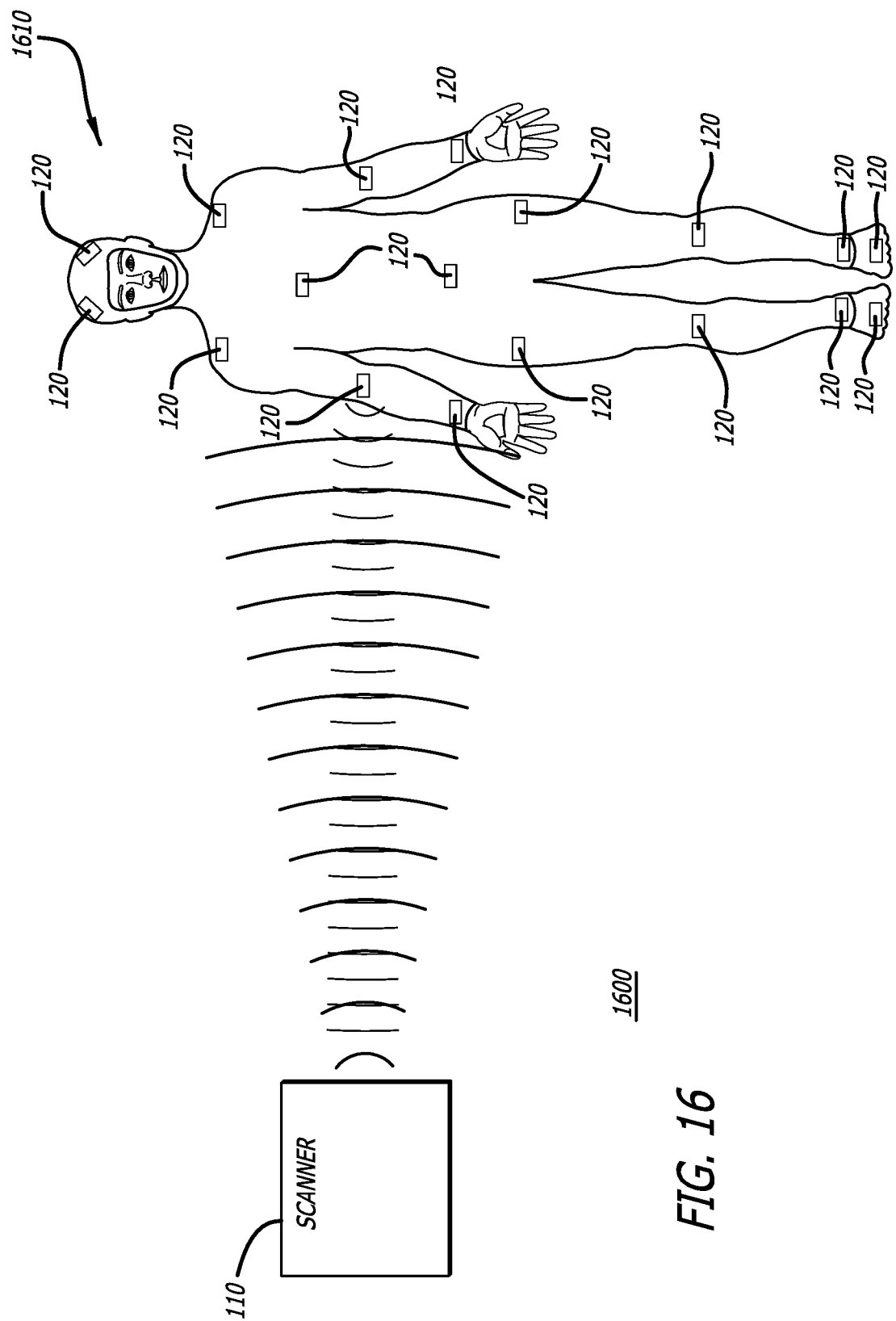
FIG. 16 is a diagram showing the disclosed system using a detector and reflectors for capturing the motion of a user, in accordance with at least one embodiment of the present disclosure.

FIG. 16 is a diagram showing the disclosed system 1600 using a detector 110 and reflectors 120 for capturing the motion of a user 1610, in accordance with at least one embodiment of the present disclosure. In particular, this figure illustrates an embodiment where a plurality of reflectors 120 are employed on a user 420 for determining the motion of the user 1610. In particular, the reflectors 120 are integrated at various different locations into a bodysuit worn by the user 1610. In addition, the detector 110 is shown positioned such that the detector 110 is transmitting and receiving signals towards and from the user 1610.

During operation of the disclosed system 1600, the detector 110 transmits an interrogation signal(s) (e.g., refer to interrogation signal(s) 130 of FIG. 1) comprising a frequency ($f_O$) towards the user 1610. The reflectors 120 on the user 1610 receive the interrogation signals(s). When the interrogation signal(s) hits the reflectors 120, the non-linear devices (e.g., refer to 220 of FIG. 2) of the reflectors 120 resonate at the interrogation signal(s) frequency ($f_O$) and generate response signals (e.g., refer to response signal(s) 140 of FIG. 1) comprising a harmonic frequency ($nf_O$, where n is an integer, such as $2f_O$), which is a multiple of the specific frequency ($f_O$) of the interrogation signal(s).

After the reflectors 120 generate the response signals comprising a harmonic frequency (e.g., $2f_O$), the detector 110 receives the response signals. At least one processor (e.g., refer to 170 of FIG. 1) of the detector 110 determines the locations of the reflectors 120 by using the response signals. In particular, the processor(s) determines the locations of the reflectors 120 by using the time of arrival (TOA) of the response signals (e.g., the difference in time from when the interrogation signal(s) was transmitted from the detector 110 and when the response signals were received by the detector 110) and/or by using the amplitude of the response signals as received by detector 110. After the processor(s) determines the locations of the reflectors 120, a display will display an abstract image capturing the motion of the user 1610 (e.g., at an instant in time) showing the locations of the reflectors 120.

It should be noted that, in one or more embodiments, each of the reflectors 120 on the bodysuit could be designed to generate a response signal(s) comprising a different harmonic frequency ($nf_O$) from one another to allow for the identification of each of the reflectors 120.

Figure 17:
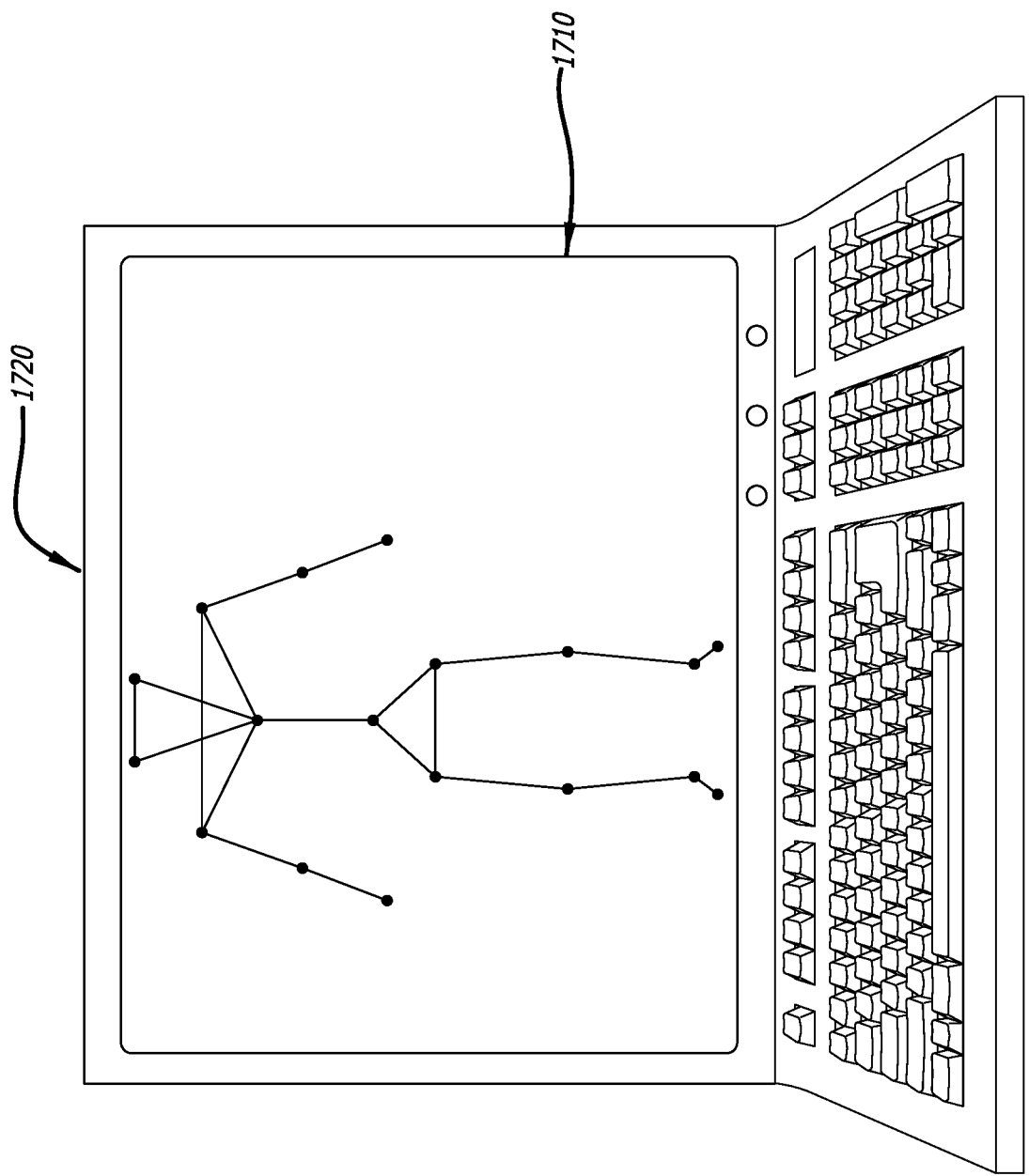
FIG. 17 is a diagram showing a display displaying an abstract illustration of the capture of motion of the user of FIG. 16, in accordance with at least one embodiment of the present disclosure.

FIG. 17 is a diagram 1700 showing a display 1710 displaying an abstract illustration of the capture of motion of the user 1610 of FIG. 16, in accordance with at least one embodiment of the present disclosure. In particular, in this figure, a display 1710 of a computing device 1720 is displaying an abstract image capturing the motion of the user 1610 (e.g., at an instant in time) showing the locations of the reflectors 120 on the image.

Figure 18:
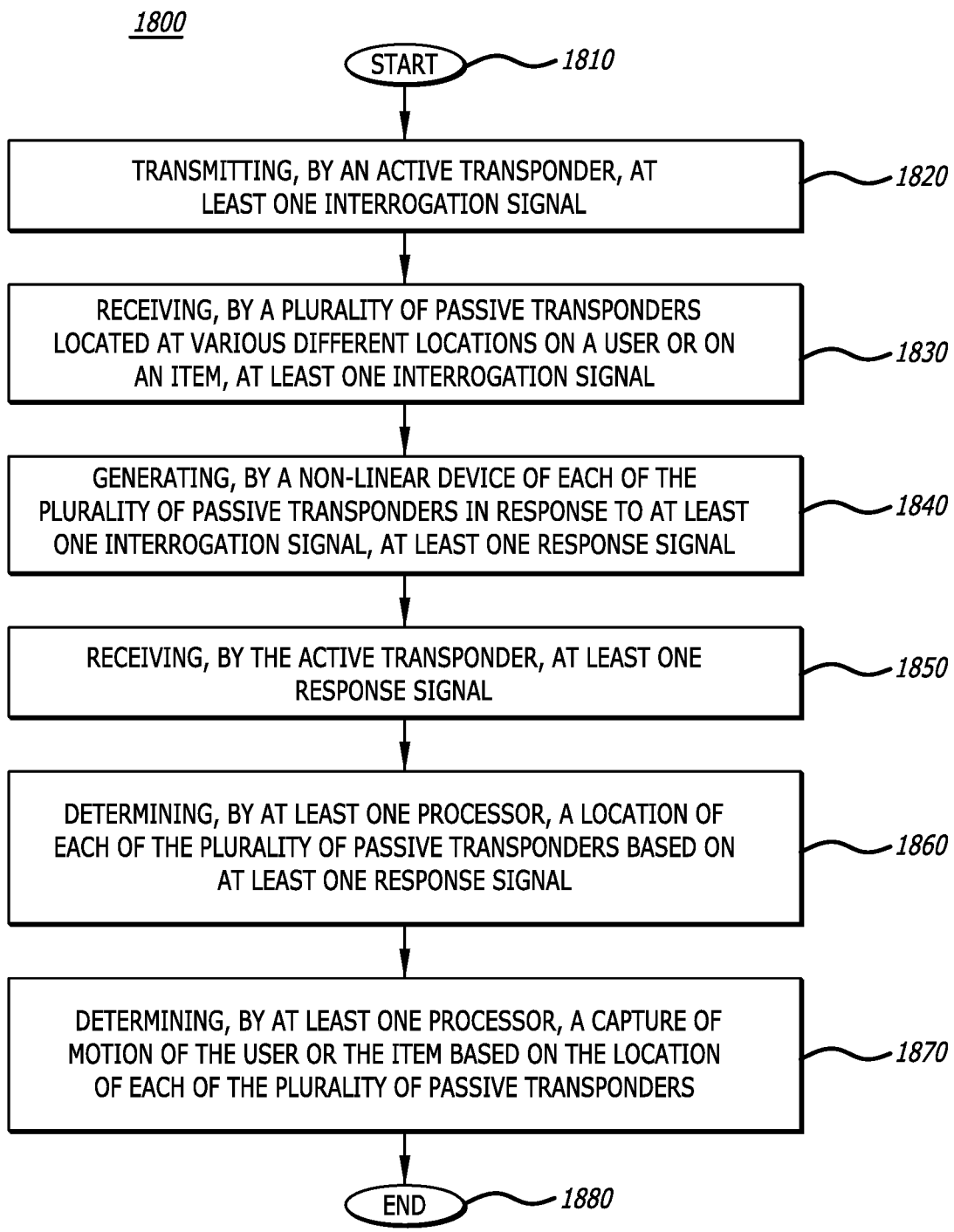
FIG. 18 is a flow chart showing the disclosed method using detectors and reflectors for capturing the motion of a user, in accordance with at least one embodiment of the present disclosure.

FIG. 18 is a flow chart showing the disclosed method 1800 using detectors and reflectors for capturing the motion of a user, in accordance with at least one embodiment of the present disclosure. At the start 1810 of the method 1800, an active transponder (e.g., detector) transmits at least one interrogation signal 1820. Then, a plurality of passive transponders (e.g., a plurality of reflectors) located at various different locations on a user (or on an item), receives at least one interrogation signal 1830. A non-linear device of each of the plurality of passive transponders, in response to at least one interrogation signal, then generates at least one response signal 1840. Then, the active transponder receives at least one response signal 1850.

Then, at least one processor determines a location of each of the plurality of passive transponders based on at least one response signal 1860. At least one processor then determines a capture of motion of the user (or the item) based on the location of each of the plurality of passive transponders 1870. Then, the method 1800 ends 1880.

Figure 19:
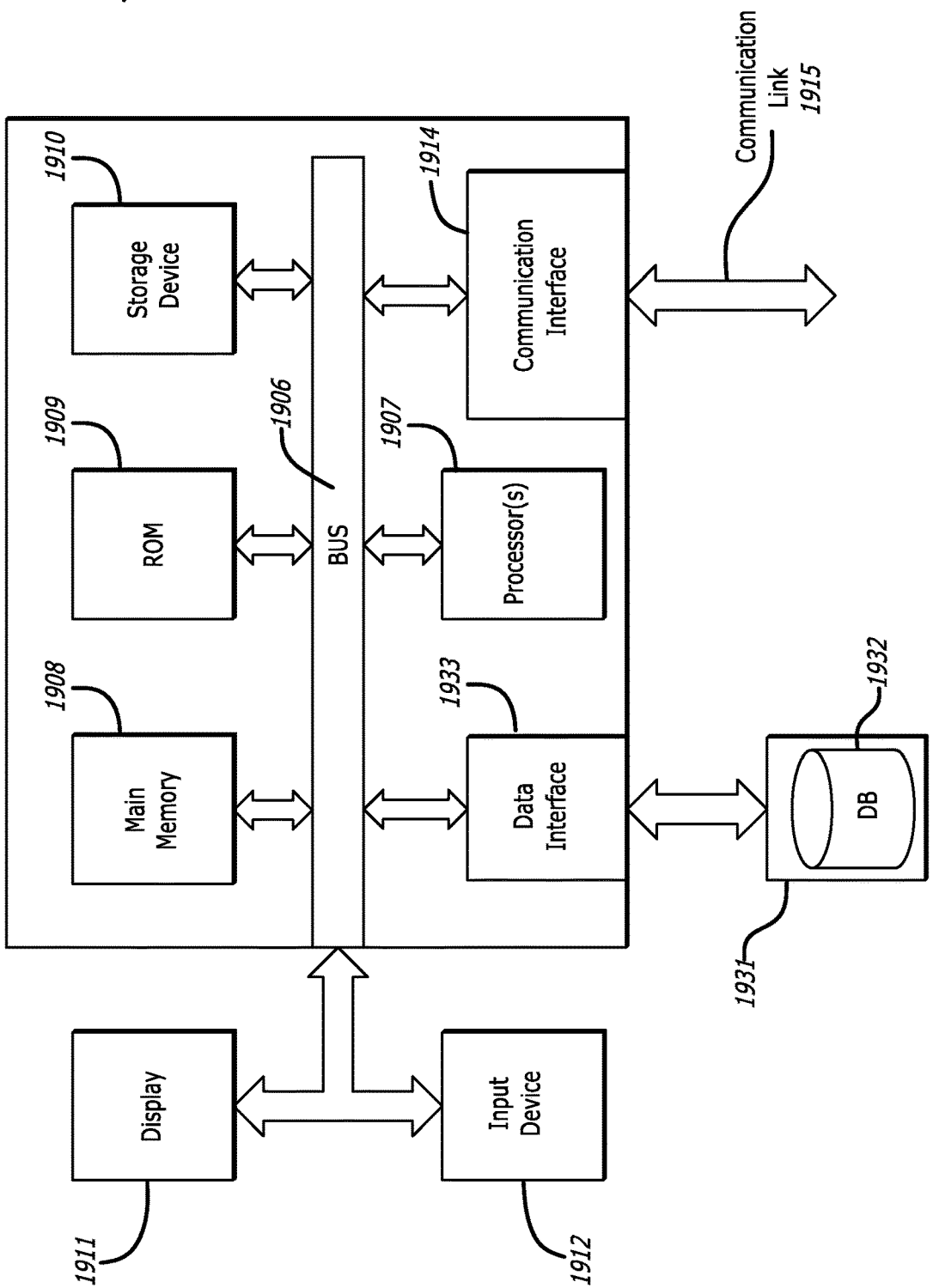
FIG. 19 illustrates a block diagram of an illustrative computing system suitable for implementing an embodiment of the present disclosure, in accordance with at least one embodiment of the present disclosure.

FIG. 19 illustrates a block diagram of an illustrative computing system 1900 suitable for implementing an embodiment of the present disclosure, in accordance with at least one embodiment of the present disclosure. For example, the active transponder (e.g., detector) 110 of FIG. 1 of the disclosed system may include and/or employ at least a portion of the disclosed computer system 1900. Computing system 1900 includes a bus 1906 or other communication mechanism for communicating information, which interconnects subsystems and devices, such as processor 1907, system memory 1908 (e.g., random-access memory (RAM)), static storage device 1909 (e.g., read-only memory (ROM)), disk drive 1910 (e.g., magnetic or optical), communication interface 1914 (e.g., modem or Ethernet card), display 1911 (e.g., cathode-ray tube (CRT) or liquid-crystal display (LCD)), input device 1912 (e.g., keyboard), and cursor control (not shown).

According to one embodiment of the present disclosure, computer system 1900 performs specific operations by processor 1907 executing one or more sequences of one or more instructions contained in system memory 1908. Such instructions may be read into system memory 1908 from another computer readable/usable medium, such as static storage device 1909 or disk drive 1910. In alternative embodiments, hard-wired circuitry may be used in place of or in combination with software instructions to implement the present disclosure. Thus, embodiments of the present disclosure are not limited to any specific combination of hardware circuitry and/or software. In one embodiment, the term "logic" shall mean any combination of software or hardware that is used to implement all or part of the present disclosure.

The term "computer readable medium" or "computer usable medium" as used herein refers to any medium that participates in providing instructions to processor 1907 for execution. Such a medium may take many forms, including but not limited to, non-volatile media, volatile media, and transmission media. Non-volatile media includes, for example, optical or magnetic disks, such as disk drive 1910. Volatile media includes dynamic memory, such as system memory 1908.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the present disclosure, execution of the sequences of instructions to practice the present disclosure is performed by a single computer system 1900. According to other embodiments of the present disclosure, two or more computer systems 1900 coupled by communication link 1915 (e.g., local area network (LAN), public telephone switched network (PTSN), or wireless network) may perform the sequence of instructions required to practice the present disclosure in coordination with one another.

Computer system 1900 may transmit and receive messages, data, and instructions, including program (e.g., application code), through communication link 1915 and communication interface 1914. Received program code may be executed by processor 1907 as it is received, and/or stored in disk drive 1910, or other non-volatile storage for later execution. Computer system 1900 may also interact with a database 1932 within a database system 1931 via a data interface 1933 where the computer system 1900 may store and retrieve information or data of the electronic design into and from the database system 1931.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. A method for machinery safety, the method comprising:
   transmitting, by an active transponder, at least one interrogation signal;
   receiving, by at least one passive transponder located one of on a user or on an item, the at least one interrogation signal;
   generating, by a non-linear device of the at least one passive transponder in response to the at least one interrogation signal, at least one response signal;
   receiving, by the active transponder, the at least one response signal;
   translating the active transponder through a first axis of rotation to transmit the at least one interrogation signal and to receive the at least one response signal over an area of interest;
   translating the active transponder through a second axis of rotation to transmit the at least one interrogation signal and receive the at least one response signal over the area of interest:
   determining, by at least one processor, a location of the at least one passive transponder based on the at least one response signal; and
   determining, by the at least one processor, whether the at least one passive transponder is located within a threshold distance away from machinery by using the location of the at least one passive transponder.

2. The method of claim 1, wherein the method further comprises, when the at least one processor determines that the at least one passive transponder is located within the threshold distance away from the machinery, generating, by the at least one processor, a warning signal indicating that the at least one passive transponder is located near the machinery.

3. The method of claim 2, wherein the method further comprises displaying, by a display, the warning signal indicating that the at least one passive transponder is located near the machinery.

4. The method of claim 1, wherein the method further comprises:
   determining, by the at least one processor, whether the machinery is operating.

5. The method of claim 4, wherein the method further comprises when the at least one processor determines that the at least one passive transponder is located within the threshold distance away from the machinery and that the machinery is operating, generating, by the at least one processor, a safety command signal to command the machinery to slow down an operating speed or to stop operating.

6. The method of claim 4, wherein the method further comprises when the at least one processor determines that the at least one passive transponder is located within the threshold distance away from the machinery and that the machinery is not operating, generating, by the at least one processor, a warning signal indicating that the at least one passive transponder is located near the machinery that is not operating.

7. The method of claim 1, wherein the non-linear device comprises one of a Schottky diode or a non-linear diode, and wherein the active transponder is a transmit and receive direct radiating horn.

8. The method of claim 1, wherein each of the at least one response signal comprises a frequency that is a harmonic frequency of the frequency of the at least one interrogation signal.

9. The method of claim 1, wherein each of the at least one response signal comprises a frequency that is a multiple of a frequency of the at least one interrogation signal.

10. The method of claim 1, wherein each of the at least one passive transponder is configured to generate signals comprising a respective frequency.

11. The method of claim 1, wherein:
the at least one interrogation signal and the at least one response signal are radio frequency (RF) signals; and
the active transponder is a directional transponder mounted on an automation platform to swivel about the first axis of rotation and the second axis of rotation.

12. The method of claim 1, wherein the determining, by the at least one processor, of the location of the at least one passive transponder based on the at least one response signal is based on at least one of a time of arrival (TOA) of the at least one response signal or an amplitude of the at least one response signal.

13. The method of claim 1, further comprising:
determining, by the at least one processor, an identification of the user or the item associated with the at least one passive transponder based on a frequency of the at least one response signal.

14. The method of claim 13, wherein each of the at least one passive transponder is configured to generate signals comprising a different harmonic frequency from one another.

15. The method of claim 13, wherein the method further comprises:
determining, by the at least one processor, whether the user is authorized for access by using the identification of the user; and
based on the at least one processor determining that the user is authorized for access, generating, by the at least one processor, an access command signal to allow access to the user.

16. The method of claim 15, wherein the access command signal allows the user to have access to at least one of a secure area, a secure computing device, or a secure file.

17. The method of claim 13, wherein the method further comprises determining, by the at least one processor, a number of users or items present by using the identification of the user or the item associated with the at least one passive transponder.

18. The method of claim 17, wherein the method further comprises:
determining, by the at least one processor, whether the number of users or items present exceeds a threshold number of users or items; and
based on the at least one processor determining that the number of users or items present exceeds the threshold number of users or items, generating, by the at least one processor, a warning signal indicating that the number of users or items present exceeds the threshold number of users or items.

19. The method of claim 1, further comprising:
determining, by the at least one processor, a capture of motion of the user or the item based on the location of the at least one passive transponder.

20. The method of claim 19, wherein the determining, by the at least one processor, of the location of the at least one passive transponder based on the at least one response signal is based on at least one of a time of arrival (TOA) of the at least one response signal or an amplitude of the at least one response signal.

* * * * *